United States Patent
Hecht et al.

(10) Patent No.: US 11,140,194 B2
(45) Date of Patent: Oct. 5, 2021

(54) MEASURING AND COMPARING SECURITY EFFICIENCY AND IMPORTANCE IN VIRTUALIZED ENVIRONMENTS

(71) Applicant: CyberArk Software Ltd., Petach-Tikva (IL)

(72) Inventors: Asaf Hecht, Tel Aviv (IL); Tal Kandel, Petach-Tikva (IL)

(73) Assignee: CyberArk Software Ltd., Petach-Tikva (IL)

(*) Notice: Subject to any disclaimer, the term of this patent is extended or adjusted under 35 U.S.C. 154(b) by 85 days.

(21) Appl. No.: 16/901,579

(22) Filed: Jun. 15, 2020

(65) Prior Publication Data

US 2021/0194913 A1 Jun. 24, 2021

Related U.S. Application Data

(63) Continuation-in-part of application No. 16/719,464, filed on Dec. 18, 2019.

(51) Int. Cl.
*H04L 29/06* (2006.01)
*G06F 9/455* (2018.01)

(52) U.S. Cl.
CPC .......... *H04L 63/1433* (2013.01); *H04L 63/20* (2013.01); *G06F 9/455* (2013.01)

(58) Field of Classification Search
CPC .... H04L 63/20; H04L 63/1433; H04L 63/102
See application file for complete search history.

(56) References Cited

U.S. PATENT DOCUMENTS

| | | | |
|---|---|---|---|
| 8,554,912 B1 | 10/2013 | Reeves et al. | |
| 10,643,002 B1* | 5/2020 | Veselov | G06F 21/6254 |
| 2013/0159049 A1 | 6/2013 | Arumugam | |
| 2014/0189865 A1* | 6/2014 | Abuelsaad | G06F 21/55 726/23 |
| 2015/0220929 A1 | 8/2015 | Monk | |
| 2019/0327271 A1 | 10/2019 | Saxena | |

OTHER PUBLICATIONS

Hecht, Asaf, CyberArk Impact 2020; "The Cloud Shadow Admin Threat: 10 Permissions to Protect", pp. 1-19, https://www.cyberarkcom/threat-research-blog/cloud-shadow-admin-threat-10-permissions-protect/.

* cited by examiner

*Primary Examiner* — Farid Homayounmehr
*Assistant Examiner* — Suman Debnath
(74) *Attorney, Agent, or Firm* — Finnegan, Henderson, Farabow, Garrett & Dunner LLP

(57) ABSTRACT

Disclosed embodiments relate to systems and methods for measuring and comparing security efficiency and importance in virtualized environments. Techniques include identifying a plurality of virtualized computing environments and calculating, for a first of the plurality of virtualized computing environments, a security-sensitivity status, the security-sensitivity status being based on at least: a size attribute of the first virtualized computing environment; an activity level of the first virtualized computing environment; a sensitivity level of the first virtualized computing environment; and a security level of the first virtualized computing environment. Further techniques include accessing a reference security-sensitivity status corresponding to the first virtualized computing environment; comparing the security-sensitivity status of the first virtualized computing environment with the reference security-sensitivity status; and identifying, based on the comparing, a security-sensitivity status gap.

20 Claims, 8 Drawing Sheets

MEASURING AND COMPARING SECURITY EFFICIENCY AND IMPORTANCE IN VIRTUALIZED ENVIRONMENTS

CROSS-REFERENCE TO RELATED APPLICATIONS

This application is a continuation-in-part of U.S. application Ser. No. 16/719,464, filed on Dec. 18, 2019, currently pending, the disclosure of which is expressly incorporated herein by reference in its entirety.

BACKGROUND

Today's computing systems and networks use a wide variety of permissions to grant users access to restricted resources. While they are an important part of many modern computing environments, permissions that are not properly managed can present significant security risks. Each additional privilege (or privilege level, or duration of privileges) presents another channel through which an attacker may gain unauthorized access to target a system, computer, application, or other resource. Ideally, a system would provide only those permissions that are necessary for it to function properly, and no more, because unused permissions unnecessarily increase the risk and severity of attacks.

The high number and large variety of types of permissions pose a unique challenge to addressing these risks. Not all unused permissions present the same level of risk for attacks. For example, some permissions may give users a greater scope of access, or access to more sensitive resources, thus increasing the potential damage that could be achieved by a malicious attacker. These problems are compounded in modern virtualized (e.g., cloud-based) computing environments. In such environments, a variety of different types of applications may be utilized, each having its own rules or policies for using privileges. Similar problems exist in modern on-premises networks, IoT networks, and other types of complex networks.

Accordingly, solutions are needed to identify unused permissions and assess their damage potential so that unused permissions may be addressed in an efficient and effective manner. It would be advantageous for such solutions to assess the damage potential using a normalized score to permit meaningful comparisons between different types of permissions. Solutions should also permit such scores to be calculated for individual permissions, groups of permissions associated with an entity, or groups of entities present within a specific environment. Score comparisons should enable the system to prioritize between permissions, entities, or environments and to identify the highest risk factors so they may be addressed on a prioritized basis.

Additionally, an organization may use a system that implements multiple different virtualized environments. A large organization may have difficulty maintaining a high level of security on a large number of different environments. The organization may also have difficulty effectively prioritizing between and efficiently allocating resources to a large number of environments. Organizations may manually prioritize environments, but these prioritizations may not be based on measurable scores.

Accordingly, solutions are needed to measure and compare the importance and security efficiency of virtualized environments. It would be advantageous for such solutions to assess the importance and security efficiency using a normalized quantitative score to permit meaningful comparisons between environments. Score comparisons should enable the system to prioritize between environments and to identify the highest risk or most important environments so they may be addressed on a prioritized basis. Solutions should also enable organizations to compare any current prioritizations with prioritization based on the normalized scores and identify the differences for effective remediation.

SUMMARY

The disclosed embodiments describe non-transitory computer readable media, systems, and methods for measuring and comparing security efficiency and importance in virtualized environments. For example, in an exemplary embodiment, there may be a non-transitory computer readable medium including instructions that, when executed by at least one processor, cause the at least one processor to perform operations for dynamically performing security comparisons among virtualized network environments. The operations may comprise identifying a plurality of virtualized computing environments; calculating, for a first of the plurality of virtualized computing environments, a security-sensitivity status, the security-sensitivity status being based on at least: a size attribute of the first virtualized computing environment; an activity level of the first virtualized computing environment; a sensitivity level of the first virtualized computing environment; and a security level of the first virtualized computing environment; accessing a reference security-sensitivity status corresponding to the first virtualized computing environment; comparing the security-sensitivity status of the first virtualized computing environment with the reference security-sensitivity status; identifying, based on the comparing, a security-sensitivity status gap for the first virtualized computing environment; and performing, based on the identified security-sensitivity status gap, at least one of: generating a report identifying the security-sensitivity status gap and the first virtualized computing environment, transmitting data regarding the security-sensitivity status gap and the first virtualized computing environment to a network security platform, or generating a selectable prompt for remediating the security-sensitivity status gap for the first virtualized computing environment.

According to a disclosed embodiment, the size attribute of the first virtualized computing environment may be determined based on at least one of: a number of identities, groups, roles, or instances in the first virtualized computing environment.

According to a disclosed embodiment, the size attribute of the first virtualized computing environment may be determined based on a file size of the first virtualized computing environment.

According to a disclosed embodiment, the activity level of the first virtualized computing environment may be determined based on at least one of: a number of actions or a frequency of actions in the first virtualized computing environment.

According to a disclosed embodiment, the activity level of the first virtualized computing environment may be determined based on a determined change in the at least one of the number of actions or the frequency of actions in the first virtualized computing environment.

According to a disclosed embodiment, the activity level of the first virtualized computing environment may be determined based on a geographic location associated with the at least one of: the number of actions or the frequency of actions in the first virtualized computing environment.

According to a disclosed embodiment, the activity level of the first virtualized computing environment may be determined based on a file size associated with the at least one of: the number of actions or the frequency of actions in the first virtualized computing environment.

According to a disclosed embodiment, the activity level of the first virtualized computing environment may be determined based on a number of automation tools associated with the at least one of: the number of actions or the frequency of actions in the first virtualized computing environment.

According to a disclosed embodiment, the reference security-sensitivity status may be at least one of: a minimal security-sensitivity status or an optimal security-sensitivity status.

According to a disclosed embodiment, the reference security-sensitivity status may be obtained from a network environment separate and independent from the plurality of virtualized computing environments, but determined to be similar to the first virtualized computing environment.

According to another disclosed embodiment, a method may be implemented for dynamically performing security comparisons among virtualized network environments. The method may comprise identifying a plurality of virtualized computing environments; calculating, for a first of the plurality of virtualized computing environments, a security-sensitivity status, the security-sensitivity status being based on at least: a size attribute of the first virtualized computing environment; an activity level of the first virtualized computing environment; a sensitivity level of the first virtualized computing environment; and a security level of the first virtualized computing environment; accessing a reference security-sensitivity status corresponding to the first virtualized computing environment; comparing the security-sensitivity status of the first virtualized computing environment with the reference security-sensitivity status; identifying, based on the comparing, a security-sensitivity status gap for the first virtualized computing environment; and performing, based on the identified security-sensitivity status gap, at least one of: generating a report identifying the security-sensitivity status gap and the first virtualized computing environment, transmitting data regarding the security-sensitivity status gap and the first virtualized computing environment to a network security platform, or generating a selectable prompt for remediating the security-sensitivity status gap for the first virtualized computing environment.

According to a disclosed embodiment, the sensitivity level of the first virtualized computing environment may be based on a number of virtualized resources in the first virtualized computing environment having privileged access restrictions.

According to a disclosed embodiment, the sensitivity level of the first virtualized computing environment may be based on an assessment of whether the first virtualized computing environment is cross-trusted with at least one other of the plurality of virtualized computing environments.

According to a disclosed embodiment, the sensitivity level of the first virtualized computing environment may be based on a number of virtualized resources in the first virtualized computing environment having encryption requirements.

According to a disclosed embodiment, the sensitivity level of the first virtualized computing environment may be based on an assessment of whether virtualized resources in the first virtualized computing environment contain a particular textual or numerical character string.

According to a disclosed embodiment, the security level of the first virtualized computing environment may be based on an assessment of whether the first virtualized computing environment complies with a security benchmark.

According to a disclosed embodiment, the security level of the first virtualized computing environment may be based on an assessment of whether the first virtualized computing environment implements a security technique.

According to a disclosed embodiment, the security level of the first virtualized computing environment may be based on a number of privileged identities in the first virtualized computing environment.

According to a disclosed embodiment, the method may further comprise consolidating security-sensitivity statuses of each of the plurality of virtualized computing environments into a consolidated level.

According to a disclosed embodiment, the method may further comprise automatically remediating the security-sensitivity status gap for the first virtualized computing environment based on the identified security-sensitivity status gap.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
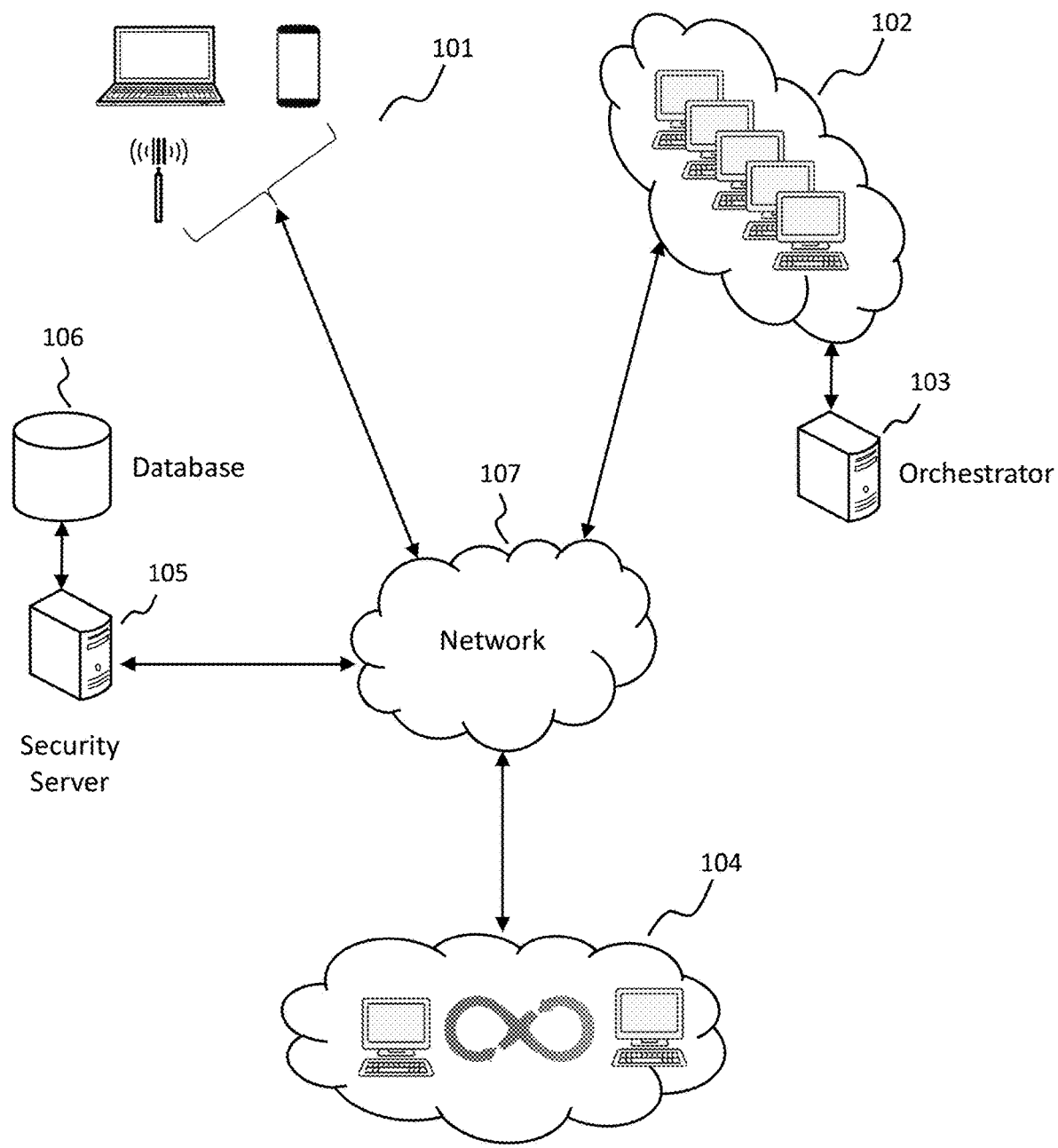
FIG. 1 is a block diagram of an exemplary system for analyzing and addressing least-privilege security threats on a composite basis.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Some of the described embodiments or elements thereof can occur or be performed simultaneously, at the same point in time, or concurrently. Additionally, various equations and expressions are described below. These equations are provided by way of example. Other variations of these equations are possible without departing from the scope of this disclosure.

In accordance with disclosed techniques, a system may have multiple users, applications, or other types of identities attempting to access a secure resource, such as a cloud computing resource. As discussed further below, an identity may be a user account, machine account, application account, virtual computing resource instance, serverless code instance, or any other type of account that may be associated with a particular user, machine, or application in a computer network. An identity may also be used to gain access to resources of a local machine or computing device, such as a locally installed application or remote desktop. An identity may access the resource using a client computing device, virtual computing instance, or other type of computing resource. In order to grant access to the identity, the resource or another part of the computing system may require authorization and/or authentication of the identity.

Such identities may have different levels of access rights associated with them, ranging from broad access rights (e.g., administrator or root-level privileges) across several platforms to very narrow access rights (e.g., network guest, or temporary accounts). Many identities with broad access rights may be labeled as administrator accounts. Such administrator accounts may be listed in an active directory group (e.g., Microsoft Active Directory™, AWS Managed Microsoft AD™, JumpCloud™ directory, or others) to more easily monitor the accounts with the greatest permissions.

However, so-called "shadow admins" may be created through direct assignment of sensitive privileges, either alone or in combination. Shadow admins may present unique threats to systems because they are not included in the admin directory and are thus harder to identify and track. Further, such shadow admins may not be subject to the same security controls as standard administrators with full access. For example, an identity may have a permission allowing it to create an access key for other accounts. A malicious user with access to this identity could then create a new access key for an administrator account, access the administrator account using the newly generated access key, and then carry out attacks using the administrator account's other sensitive permissions. Thus, any identity having the permission to create an access key may, in some circumstances, need to be subject to the same security protocols as full-access administrative accounts.

Modern computing environments often include numerous different identities. Some or all such identities may be dispersed among on-premises and/or virtualized (e.g., cloud-based) network environments. As the number of active permissions in an environment grows, however, this often leads to a greater attack surface for malicious users and thus a greater potential that a malicious user can cause damage to the environment. It can therefore be advantageous to limit the total number of permissions in any given environment. Ideally, the only permissions existing within the environment would be those that are actively used or required, and such permissions would be monitored according to the potential security threat that they pose. A permission that is not used (e.g., unused to its full scope, unused for a period of time, etc.) presents an unnecessary threat that offers no value to the environment.

In the disclosed embodiments, techniques of analyzing and addressing least-privilege security threats on a composite basis are described. In some embodiments, a least-privilege damage score may be calculated that quantifies the threat that an unused permission poses to a secure entity or environment. In other embodiments, scores for individual permissions may be aggregated to calculate a score for the entity. In further embodiments, scores for multiple entities may be aggregated into a single score for a specific environment. In some embodiments, changes to the permissions or environment may be made based upon the one or more scores.

Disclosed embodiments enable an identity (e.g., application, service, user, etc.) to access and execute functions on a remote resource securely, with least-privileges (i.e., a minimal scope of needed privileges, and/or a minimal duration of privileges). Further, disclosed systems are compatible with protocols enabling remote sessions, e.g., RDP, and HTML5 solutions, as well as protocols supporting tunneling to a remote machine, e.g., SSH port forwarding. Over RDP, for example, the system may use clients such as RD-desktop, Terminal Server Client (TS client), VirtualBox Remote Display Protocol (VRDP)™, Free RDP, or any other RDP client. Alternatively, process execution may be facilitated by an application enabling a remote desktop, e.g., Remote Desktop by Google Chrome™, TeamViewer™, LogmeIn™, or Citrix™, as well as other remote access services. For example, if LogmeIn™ is already installed on the target resource, it may be used to connect to the target resource transparently and perform automatic remote process execution.

Further, in other embodiments, the system may enable an identity to access a group of target resources. e.g., to execute code and/or automated processes on the group of target resources, or to perform other actions. For example, the system may invoke automated execution on a plurality of defined target applications or machines. This may be useful in situations where a common task needs to be performed for a group of resources (e.g., a software update, patch installation, data provisioning, etc.). An identity may also be able to enable automated remote process execution on one or a group of target resources. For example, a user may execute automatic upgrades to existing applications on a target resource; retrieve data from the resource; access files, data, or applications residing on the resource; retrieve metrics stored by or associated with the resource; perform one-time or regular maintenance on the resource; perform and/or schedule a job to execute periodically on the resource; retrieve keystrokes and/or window titles associated with a remote session, without requiring administrator privileges on the resource; and perform various other operations.

In some embodiments, the system may identify a prompt from a client computing device associated with an identity requesting access to a target resource. As disclosed below, a computer device may be any of numerous types of devices with data processing and network communications capabilities. Examples include servers, desktop computers, cloud-computing virtual machines or containers, laptops, smart-phones, tablets, personal digital assistants, enterprise digital assistants, smart cards, smart watches, smart bands, smart headphones, computer-embedded clothing, car-computers and other in-vehicle computer equipment, Internet-of-Things (IoT) devices, and any other device with data processing and network connectivity capabilities.

Some organizations may have large systems that implement a variety of different virtualized computing environments. In some cases, the environments may even be from multiple cloud providers (e.g., AWS™, Azure™, Google Cloud Platform™, and others). Some environments may be used for different purposes, such as production, data storage, or machine learning, but other environments may serve multiple purposes and include a variety of products (e.g., virtual machines, containers, storage, security products, and the like). Some environments may correspond to a division or department within the organization, such as a research and development division, a legal division, a financial division, a marketing division, etc.

In some cases, an organization may have hundreds of different cloud environments. The organization may need to determine how to prioritize between these environments to efficiently allocate resources to the environments. In further disclosed embodiments, techniques of dynamically performing security comparisons among virtualized network environments are described. In some embodiments, a security-sensitivity status score may be calculated that quantifies an environment's importance or sensitivity to security issues. In other embodiments, scores for environments may be compared so that priorities among the environments may be determined, for example in a priority list. The scores or priority list may be compared against a reference, which may indicate the current security measures or current allocation of resources of the organization. This comparison may be used to identify a security gap, which may indicate where the organization can improve its security efficiency or revise its order of priorities with respect to the environments. In the disclosed embodiments, based on the security gap, security actions may be taken to remediate the gap (e.g., by improving the efficiency of resource allocation, reprioritizing environments, implementing new security controls, etc.).

Reference will now be made in detail to the disclosed embodiments, examples of which are illustrated in the accompanying drawings.

FIG. 1 is a block diagram of an exemplary system for analyzing and addressing least-privilege security threats on a composite basis. System 100 may include client device 101, cloud computing environment 102, cloud orchestrator 103, DevOps environment 104, security server 105, database 106, and network 107 as shown in FIG. 1. Exemplary implementations of these components are discussed below. While FIG. 1 includes particular numbers or arrangements of these components, in various embodiments the number, arrangement, and presence of such components may vary.

Client devices 101 may include a variety of types of devices, including those capable of communication over a network. As illustrated, client devices 101 may be one or more of a personal computer (e.g., a desktop or laptop), an IoT device (e.g., sensor, smart home appliance, printer, connected vehicle, industrial device, etc.), or a handheld device (e.g., a mobile phone, a tablet, notebook, digital camera, etc.). Client device 101 may also be a vehicle-based or aircraft-based computer, a virtual machine (e.g., virtualized computer, container instance, etc.), a wearable device (e.g., a smart watch, smart jewelry, an implantable device, a fitness tracker, smart clothing, a head-mounted display, etc.), or various other devices capable of processing and/or receiving data. Client devices 101 may also be a server or other network connected computing resource.

In accordance with disclosed embodiments, client devices 101 may be associated with one or more identity. An identity may access, or attempt to access, resources distributed in a computer network and, additionally or alternatively, one or more resources of a local machine or computing device, such as a locally installed application, for example. The identity may also have a number of permissions associated with it that, once authenticated, give the identity access to restricted resources or grant the identity the ability to execute code on the resource, etc.

As described herein, in some embodiments, identities, computer devices, or users may be authenticated before access to and/or control of a target resource is granted or before an identity can cause the target resource to execute code. Authentication may broadly take several forms, such as verification of passwords, SSH keys, asymmetric (e.g., public/private) keys, symmetric keys, Kerberos tickets, Docker signed tags, and other types of cryptographic data or privileged security or access tokens. Further, the authentication may be based on white/black lists for identities or device addresses, or biometric or behavioral information, such as fingerprints, retinal scans, x-rays, biosensors, voice recognition, body movements, walking pace or rhythm, sitting characteristics or patterns, key stroke analysis, and more. In accordance with the disclosed embodiments, the authentication may be single-factor or multi-factor (i.e., a combination of any of the foregoing forms of authentication). Further, as discussed below, the authentication may be performed on the computer device 101, on a remote authentication server (e.g., security server 105), or through a combination of functionality of both.

Cloud computing environment 102 may include one or more virtual machines, which may be based on virtualization tools provided by Amazon Web Services™ (AWS), Microsoft Azure™, IBM Cloud™, Google Cloud Platform™, Cisco Metapod™, Joyent™, vmWare™, or others. Cloud computing environment 102 may include various computing resources, storage resources, security services, developer tools, analytics tools, etc. that may be accessed by client device 101. As an example, AWS™ provides many varying cloud services including searching/analytics (e.g., CloudSearch™), virtual servers (e.g., EC2™), media services (e.g., MediaConvert™), database services (e.g., Aurora™), storage (e.g., S3™), and others. Cloud computing environment 102 may include various entities, machines, or services that include various permissions. Cloud computing environment 102 may be in communication with cloud orchestrator 103. Orchestrator 103 communicates with the different entities or components of cloud computing environment 102 to configure and deploy cloud computing services. In various embodiments, orchestrator 103 may be based on platforms such as AppFormix™, BMC Cloud LifeCycle Management™, IBM Cloud Orchestrator™, AWS CloudFormation™, Kubernetes™, or others.

Client device 101 may communicate with cloud computing environment 102 over a network 107. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, network 107 may be a cloud network, (e.g., private cloud, public cloud, or hybrid cloud network), or a combination of these types of networks. In some embodiments, the communications may take place across two or more of these forms of networks and protocols.

DevOps environment 104 may also be in communication with other components of system 100 through network 107. DevOps environment 104 may implement a DevOps, continuous development, or continuous deployment process. In some embodiments. DevOps or similar processes may be implemented in DevOps environment 104 to continuously develop or deploy new code to configure, update, or replace services or virtual machines within cloud computing environment 102. DevOps environment 104 may include one or more computers, servers, and storage resources used to implement DevOps processes. In some embodiments, new virtual instances within cloud computing environment 104 may be configured or updated through DevOps environment 104 before they are deployed. In various embodiments, DevOps environment 104 may be based on platforms such as Chef™, Puppet™, Ansible™, Splunk™, or others.

System 100 may also comprise one or more security servers 105 in communication with network 107. Security server 105 may perform authentication and/or authorization for various components of system 100. Further, security server 105 may perform the techniques described below in connection with FIGS. 2-8. In an example implementation, security server 105 may be in communication with a client device 101 and cloud computing environment 102 such that security server 105 may grant access to a cloud computing service in cloud computing environment 102 when requested by an identity associated with a user of client device 101. In some embodiments, security server 105 may authenticate and/or authorize the identity for such access. Security server 105 may also manage and store permissions for identities associated with client devices 101. For example, permissions and credentials may be stored using platforms such as CyberArk's Privileged Access Security™, Centrify's Privileged Access Service™, IBM's Security Privileged Identity Manager™, AWS's Identity and Access Management™, Azure's Active Directory Privileged Identity Management™, or various others. Security server 105 may also communicate with database 106. Database 106 may comprise a single database, multiple databases, cloud storage, or other data storage services. In some embodiments, database 106 may be storage local to or integrated with the security server 105. In other embodiments, database 106 may be separate or remote. Database 106 may store lists of permissions, lists or directories of identities, other information associated with identities, etc.

Figure 2:
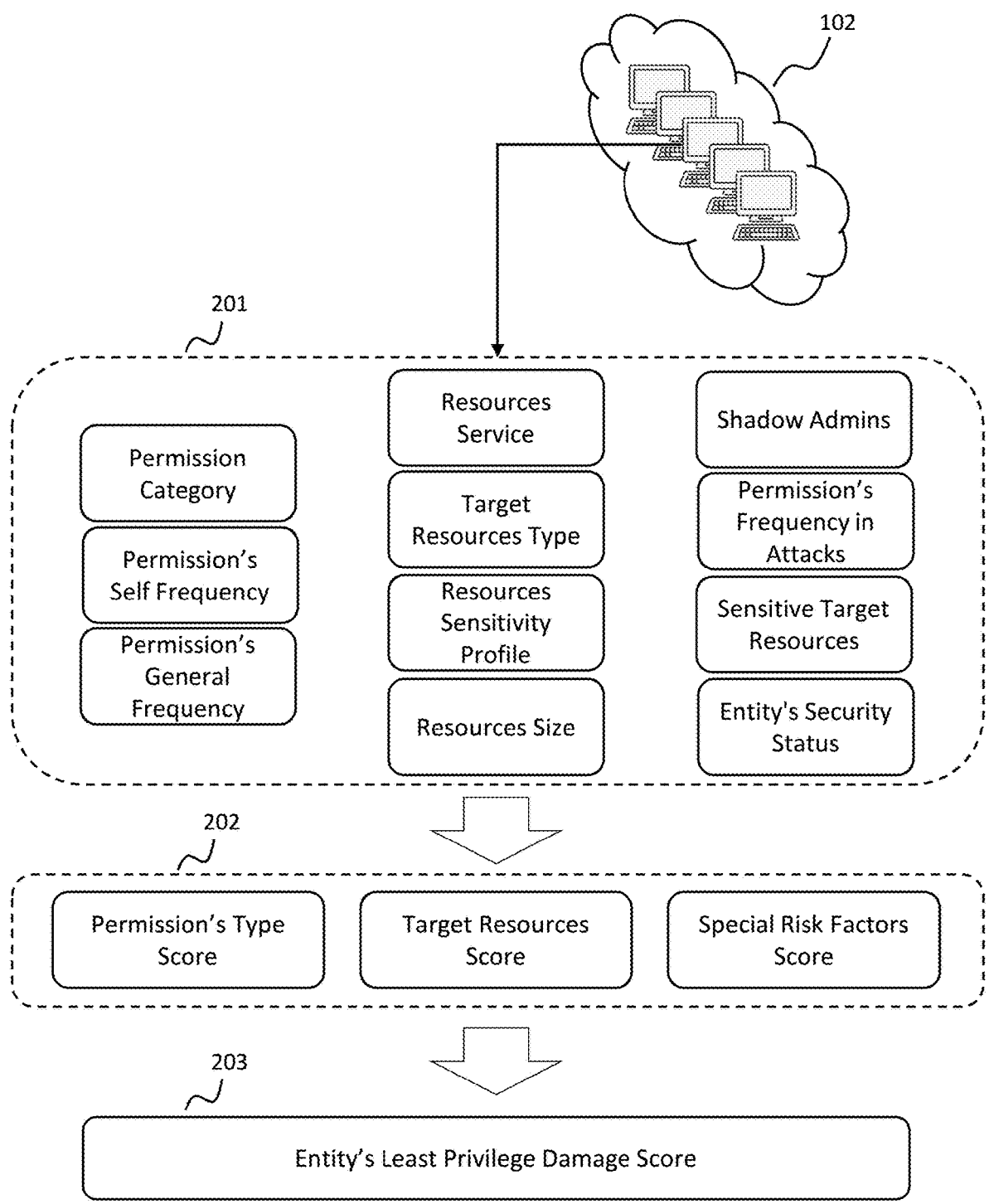
FIG. 2 is an illustration depicting the relationship between different types of least-privilege damage scores.

FIG. 2 is an illustration depicting the relationship between different levels of privilege damage scores, as discussed further below. A least-privilege damage score may be a normalized score that quantifies the extent of the security risk associated with specific permissions of an entity, for example a secure network resource, account, application, etc. The score may also correspond to the severity of the risk, the potential damage that could be caused by exploitation of the permission, the impact of a security breach using the permission, the urgency of making a change to address the potential risk of the permission, etc. As mentioned above, it may be desirable to limit the number of permissions that identities in an environment have to only the permissions that are actually needed for particular authorized functions, and no more (e.g., in scope or time). Reducing the number of unused permissions may reduce the number of potential avenues of attack for a malicious entity, without affecting legitimate operations in the environment. Thus, in some environments a least-privilege ratio can be calculated that compares the number of unused permissions to the number of total permissions. However, such a score does not take into account any potential differences between permissions. For example, an unused "delete" permission may present a greater risk to a system than an unused "read" permission because a malicious user could cause more harm by gaining access to the delete permission. A least-privilege damage score, as discussed below, may remedy this deficiency by addressing the amount of risk presented by a specific permission given the particular configuration of an environment.

As discussed above, cloud computing environment 102 may include, for example, a cloud computing service with a plurality of permissions associated with one or more virtualized identities. Group 201 of FIG. 2 illustrates the different least-privilege damage sub-scores that may be calculated for each permission. Sub-scores may be calculated based upon the permission's type, the affected resources, special risk factors, or other considerations. For example, an individual sub-score for each permission may be calculated for each one of the considerations shown in group 201. Thus, as illustrated in FIG. 2, for a given permission, a separate sub-score may be calculated based upon the permission's category, the permission's self-frequency, the permission's general frequency, the resource's service, the target resource's type, the resource's sensitivity profile, the resource's size, presence of or possibility of shadow administrators, the permission's frequency in attacks, unusually sensitive target resources, the security status of an entity associated with the permission, etc. While this list is not exhaustive, each of the exemplary sub-scores listed are discussed in greater detail below. In some embodiments, one or more of the sub-scores may be automatically assigned. For example, a machine learning algorithm may be used to learn the attributes, usage, etc. of different permissions for different entities, then assign sub-scores based upon that information. In some embodiments, one or more of the sub-scores may be manually configured.

Different types of permissions may be broken down into a plurality of predefined categories corresponding to different risk levels. For example, "list" and "describe" permissions (and other read-only permissions) may receive a category risk level of 1 (low), while "create user" and "delete user" permissions may receive a category risk level of 5 (high), thus creating a range of possible sub-scores based on the permission's category. A permission's self-frequency sub-score may be based upon a determination of how ordinary and frequent it is for the permission to be used by the particular identity it is associated with. For example, an entity using CreateGroup and CreateRole permissions in the past, would be reasonably expected have the CreateUser permission, thus the self-frequency potential damage score would be relatively low compared to an identity that has the CreateUser permission but has never used a "create" permission before. Similarly, a permission general frequency sub-score may be based upon a determination of how often the permission is used overall in the entire environment. For example, a more sensitive permission would often be used less frequently and used by fewer identities in the environment, and thus would receive a higher sub-score for being a more sensitive permission.

Separate sub-scores may also be calculated for the considerations related to the affected resources. The affected resource may be the target resource to which the permission grants access, ability to update, ability to alter, etc., for example, a cloud computing service, computing device, database, or similar resource. The resource's service sub-score may be based upon pre-assigned groupings of different services. Similarly, a service type sub-score may be calculated based upon the type of service offered. For example, search tools may present less risk and thus have lower service type sub-scores than storage services or authentication resources. A sub-score may also be calculated for the target resource's sensitivity profile. The sensitivity profile sub-score may be based upon a pre-defined score quantifying how sensitive the target resource is to attack. For example, a publicly available resource may be less sensitive than a resource containing secret data and/or requiring authentication for access. Accordingly, the publicly available resource may have a lower sensitivity profile sub-score. A sub-score may also be calculated based upon the size of the target resource(s). For example, if the permission affects a small number of resources or identities, it may have a lower target resource size sub-score than a permission affecting hundreds of resources or identities.

Separate scores may also be calculated for the considerations related to other special risk factors. Special risk factors may include the presence of or possibility of shadow admins, the permission's frequency in attacks, unusually sensitive target resources, or the security status of entity the permission. For example, a shadow admins sub-score may be high if the permission has the equivalent power of full administrative or root privileges. In some embodiments, the shadow admin sub-score may be a binary score, i.e., either 1 or 0, or either yes or no, indicating that the entity either is or is not a shadow admin. In some systems, a certain permission may have been used in past attacks. Thus, a sub-score may be calculated based upon the permission's frequency in previous attacks, giving a higher score to permissions that are likely to be used in an attack again. An unusually sensitive target may be, for example, a database containing extremely sensitive information. Thus, even a "read" permission on such a sensitive database may have an unusually high damage potential. The entity's security status sub-score may also relate to the type of security implemented by the entity associated with the permission. For example, if the entity with the unused permission is not secure, it may have a higher probability of being compromised, and thus may be assigned a higher damage sub-score. In some embodiments, this score may be calculated based upon an assessment of the parameters of a privileged access security system, including password age, credentials complex policy, automatic credential rotation, multi-factor authentication, credential protection in the endpoints or servers, the number of people with access to the entity's credentials, the number of employees with access to the entity's password, whether the credentials are being used directly in code, etc.

In some embodiments, one or more of the sub-scores may be combined to form aggregate scores 202. Aggregate scores may be created by normalizing and weighting sub-scores. For example, a permission's sub-scores corresponding to permission category, permission self-frequency, and permission general frequency may be combined to form a weighted aggregate Permission's Type Score. Similarly, a permission's resource's service, target resource type, resource sensitivity profile, and resource size may be combined to form an aggregate Target Resources Score. Likewise, in some embodiments, the permission sub-score corresponding to the presence of or possibility of shadow admins, the permission's frequency in attacks, unusually sensitive target resources, and the security status of entity the permission may be combined to form an aggregate Special Risk Factors Score.

To calculate the aggregate scores 202, each sub-score within group 201 may be assigned an absolute or relative weight. For example, the more critical scores may receive a weight of 50, while the less critical scores may receive a weight of 5. The sub-score 202 may then be calculated using the different separate scores, which may be weighted and normalized into a single score. An exemplary equation for calculating the weighted aggregate Permission Type score is shown below, where N1 corresponds to the maximum permission category sub-score, N2 is the maximum permission self-frequency sub-score, and N3 is the maximum permission general frequency sub-score. In some embodiments, other aggregate scores may be calculated in a similar manner. Weights may be assigned manually or automatically. In some embodiments, the weights may be dynamically adjusted, by, for example, a machine learning algorithm.

$$\frac{(\text{Permission Category score}) \times (\text{weight1}) + (\text{Self Frequency score}) \times (\text{weight2}) + (\text{General Frequency score}) \times (\text{weight3})}{N1 \times (\text{weight1}) + N2 \times (\text{weight2}) + N3 \times (\text{weight3})}$$

Calculating the score using the equation shown above may result in an aggregate least-privilege damage score with a value between 0 and 1. The closer a permission's score is to 1, the higher the potential damage the permission may cause. Likewise, the closer a score is to 0, the lesser the potential damage. Other variations on this equation, and the resulting score range, are possible as well.

In some embodiments, aggregate scores 202 that correspond to an entity may be combined to form the Entity's Least-Privilege Damage Score 203. The Entity's Least-Privilege Damage Score 203 is described in greater detail with respect to FIG. 3, below.

Figure 3:
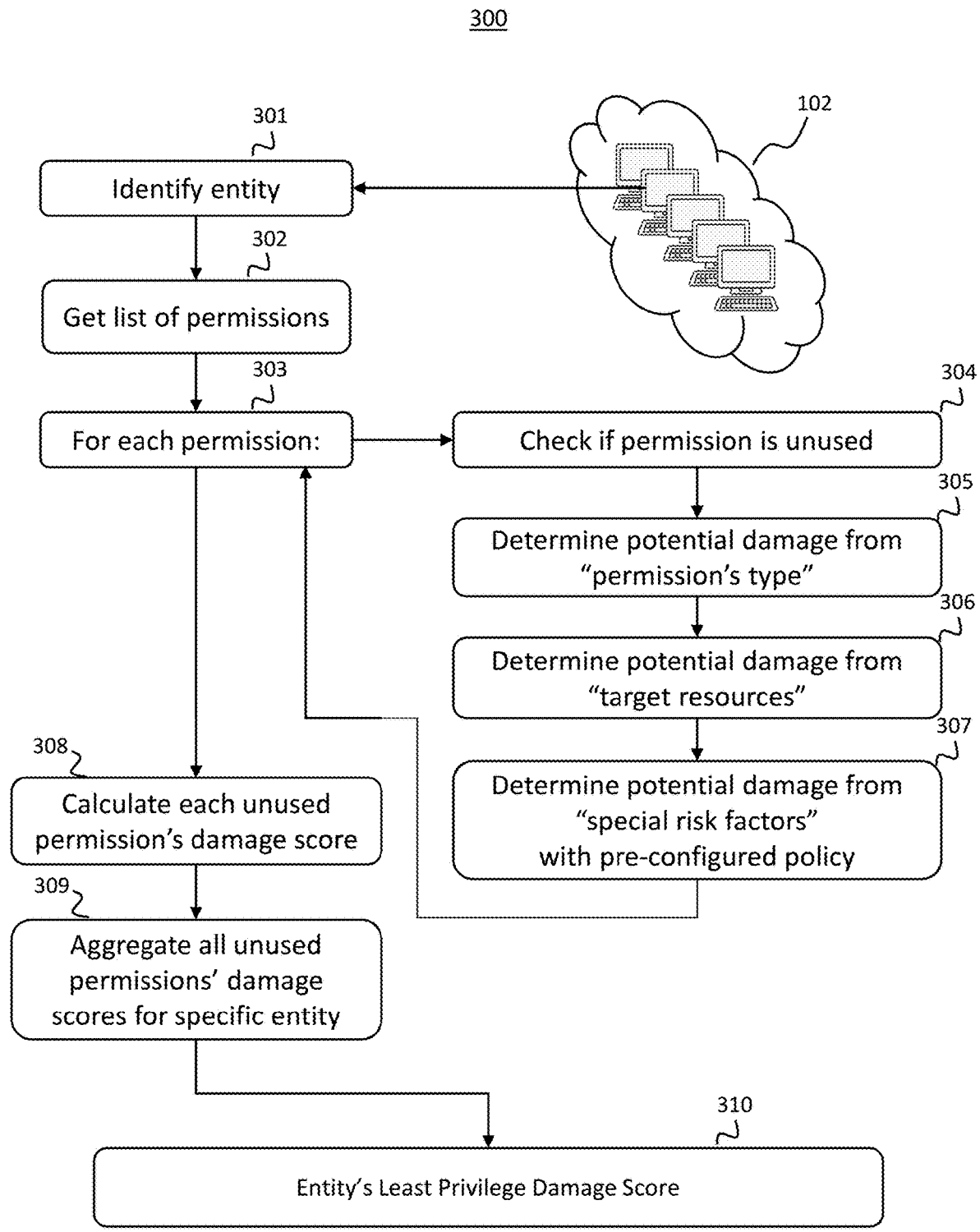
FIG. 3 is a flowchart depicting an exemplary process for calculating an entity's least-privilege damage score.

FIG. 3 is a flowchart depicting an exemplary process 300 for calculating an entity's least-privilege damage score. Process 300 may be carried out by, for example, security server 105 as discussed above in connection with FIG. 1. At step 301, process 300 may include identifying an entity (e.g., network identity) associated with cloud computing environment 102 that has one or more permissions. Consistent with the discussion above, this may include accessing a network directory service (e.g., Microsoft Active Directory™, AWS Managed Microsoft AD™, JumpCloud™ directory, etc.) or a cloud orchestration service (e.g., cloud orchestrator 103). At step 302, process 300 may retrieve a list of permissions associated with the entity. In some embodiments, the list of permissions may be retrieved from security server 105. In some embodiments, the security server 105 may retrieve the permissions list from database 106. For example, as discussed above, security server 105 and/or cloud orchestrator 103 may manage permissions using platforms such as CyberArk's Privileged Access Security™, Centrify's Privileged Access Service™, IBM's Security Privileged Identity Manager™, AWS's Identity and Access Management™, Azure's Active Directory Privileged Identity Management™, or various others.

At step 303, process 300 may iterate through a plurality of sub-steps, 304-307, for each permission identified in the list of permissions. In step 304, process 300 may determine if the permission is unused. The determination of whether a permission is unused may be based on an assessment of one or more parameters associated with the use of permission. The criteria for whether a permission is considered unused may be configurable by the system, for example, by security server 105. In some embodiments, process 300 may determine that a permission is unused if the permission has never been used before. In further embodiments, process 300 may determine that a permission is unused if the permission has not been used with a certain period of time defined by the system. As an example, if a permission has not been used in the previous 3 months, process 300 may consider the permission unused. In some embodiments, the determination of whether a permission is used may be indicated by a usage status of the permission. The usage status may be a binary value (i.e., either 1 or 0, or either yes or no) indicating that the permission is either used or unused. In other embodiments, the usage status may be a sliding scale that indicates how much the permission is used (e.g., a scale of 1 to 10, with 1 being never used and 10 being used very frequently). In such embodiments, the system may a set threshold value to decide if a permission is used or unused. For example, a system may set a threshold of 4, meaning that any permission having a usage status value of less than 4 is considered unused.

If process 300 determines that a permission is unused, it may advance to step 305. If process 300 determines that a permission is used, process 300 may move on to evaluate another permission within the list of permissions.

In step 305, process 300 may determine the potential damage from the permission's type. The potential damage may be quantified as a score, level, category, etc. As discussed above with respect to FIG. 2, a permission type score may be calculated based upon one or more sub-scores associated with the permission, including permission category, permission self-frequency, permission general frequency, or others.

In step 306, process 300 may determine the potential damage based on the target resources associated with the entity and/or the privilege. The potential damage may be quantified as a score. As discussed above with respect to FIG. 2, a target resource score may be calculated based upon one or more sub-scores associated with the permission, including the resource's service, target resources type, resource's sensitivity profile, and resource's size.

In step 307, process 300 may determine the potential damage based on special risk factors. The potential damage may be quantified as a score. As discussed above with respect to FIG. 2, a target resource score may be calculated based upon one or more sub-scores associated with the permission, including the potential for shadow admins, permission's frequency in attacks, sensitive target resources, and the entity's security status. The determination may be based upon pre-configured policies that define special risk factors or the scores associated with the special risk factors.

In step 308, process 300 may calculate a least-privilege damage score for each unused permission. In some embodiments, the least-privilege damage score may be calculated by weighting and combining the potential damage scores from the permission's type, target resources, and special risk factors, calculated in steps 305-307 above. The score may be calculated using, for example, the techniques discussed above. The score may be expressed as a numerical value (e.g., between 0 and 1, or 1 and 100), a percentage, a level, a category, etc.

In step 309, process 300 may aggregate all of the unused permissions' damage scores calculated in step 308. In step 310, process 300 may output the entity's least-privilege damage score, calculated from the aggregate of the of the unused permissions' damage scores for the entity. In some embodiments, the permission scores may be weighted when calculating the entity's least-privilege damage score. As discussed above with respect to FIG. 2, weights may be assigned manually or automatically by the system. In some embodiments, the weights may be dynamically assigned by, for example, a machine learning algorithm.

Figure 4:
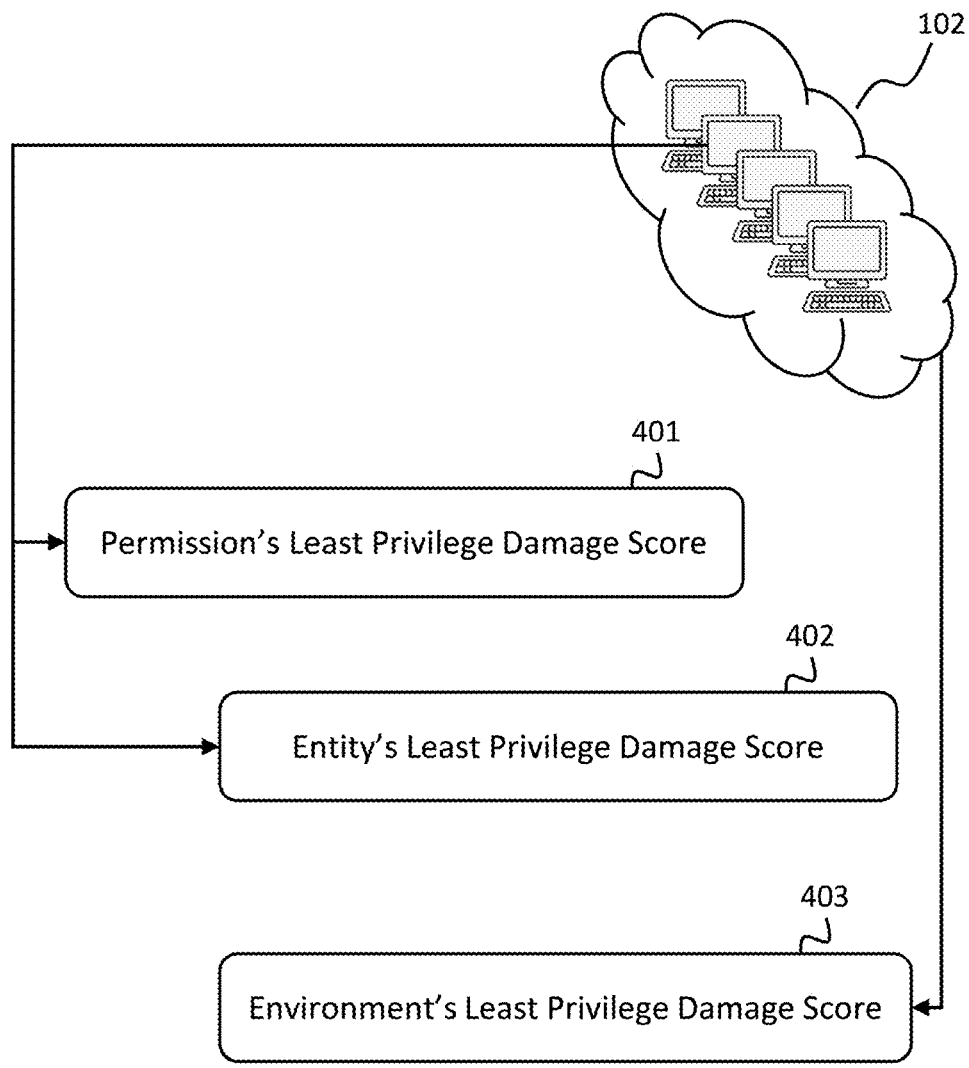
FIG. 4 is an illustration depicting multiple types of least-privilege damage scores.

FIG. 4 is an illustration of a system 400 depicting multiple types of least-privilege damage scores. A permission least-privilege damage score 401 may be calculated for each permission associated with an entity within cloud computing environment 102. As discussed above with respect to FIGS. 2 and 3, an entity's least-privilege damage score 402 may be calculated by aggregating the permission least-privilege damage scores 401 for each permission associated with the entity. Similarly, an environment's least-privilege damage score 403 may be calculated by aggregating the entity least-privilege damage scores 402 for each entity associated with the environment. Such aggregate scores may be calculated similarly to the equation discussed above with respect to FIG. 2. In some embodiments, the entity scores may be weighted such that the more sensitive or important entities are given more weight than less critical entities.

In some embodiments, least-privilege damage scores may be compared in order to prioritize which permissions/entities/environments should be addressed first or on a prioritized basis. For example, aggregate scores for several different entities may be compared. The entity with the highest score (most at risk), may be addressed first, consistent with FIG. 5, below. Then, the system may compare the scores corresponding to different permissions associated with the entity. The permission within the entity with the highest score may then be the first permission addressed by the system. Such prioritization permits the system to act most efficiently by addressing the most at-risk permissions/entities/environments first. In some embodiments, security server 105 may implement machine learning algorithms to more efficiently assign sub-scores, compare scores, and prioritize permissions/entities.

Figure 5:
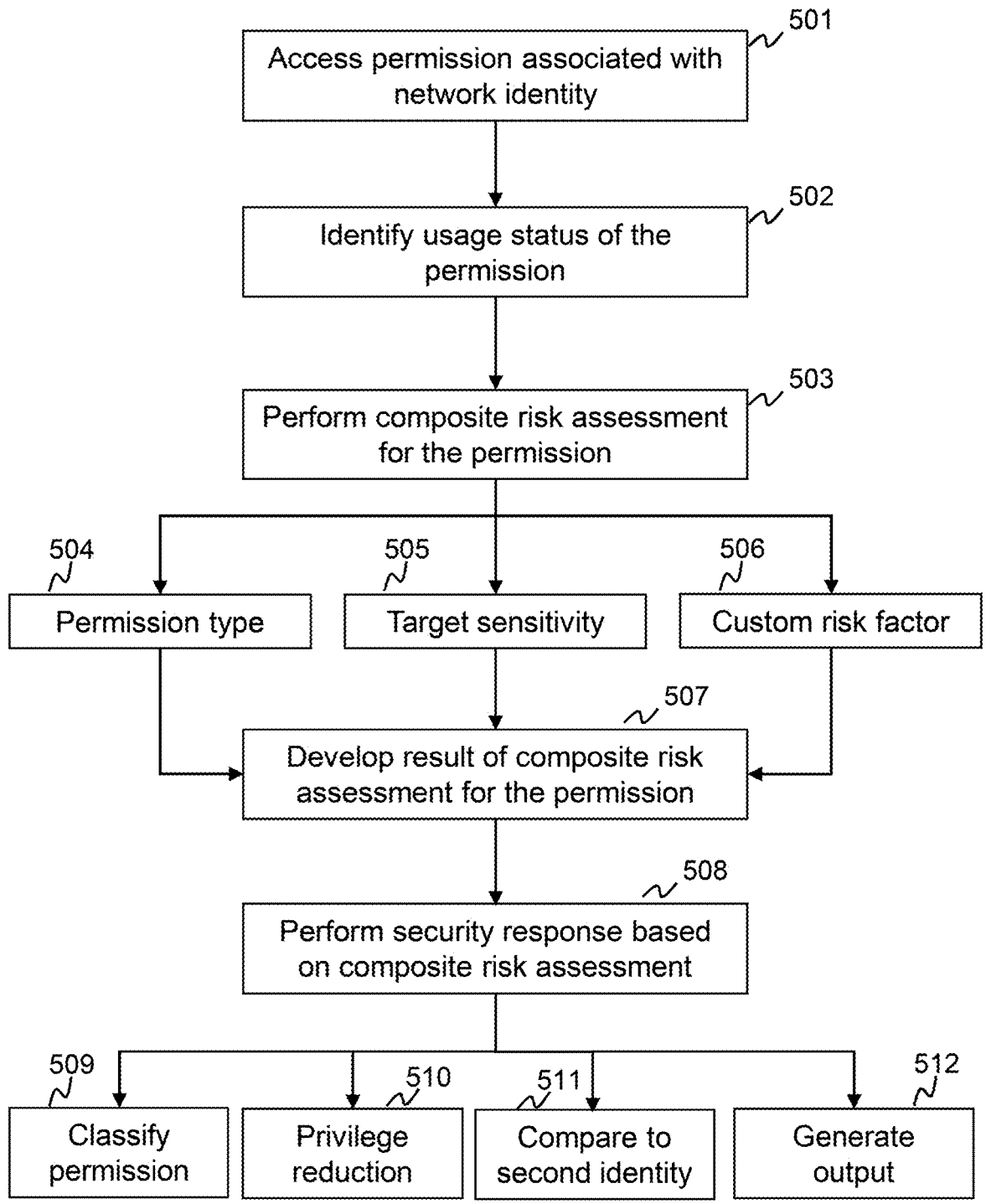
FIG. 5 is a flowchart depicting an exemplary process for performing a composite risk assessment and generating a security response.

FIG. 5 is a flowchart depicting an exemplary process 500 for performing a composite risk assessment and generating a security response. Process 500 may be executed by, for example, security server 105 as shown in FIG. 1. Process 500 may correspond to parts of FIGS. 2-4, and accordingly, descriptions of the components and processes therein may apply to process 500 as well. At step 501, process 500 may access a permission associated with a network identity. The network identity, for example, may be associated with client device 101.

At step 502, process 500 may include identifying a usage status of the accessed permission. The usage status, as described above with respect to FIG. 3, may be determined based upon, for example, whether the permission has ever been used, the number of times it has been used, whether the permission has been used within a specific time period, etc. In some embodiments, the usage status may be calculated based upon multiple factors. In some embodiments, the usage status may be a number that may be compared to a threshold value. In some embodiments, the usage status threshold value may be determined by the security server 105. If the usage status is below the threshold value, process 500 may continue to step 503. In some embodiments, if the usage status exceeds the threshold value, process 500 may not continue to step 503 and may not perform the composite risk assessment.

At step 503, process 500 may commence performing a composite risk assessment for the permission. The composite risk assessment may include identifying attributes of the permission (steps 504-506). Several examples of attributes of permissions were discussed above with respect to FIG. 2. Process 500 may further execute one or more of steps 504-506. At step 504, process 500 may identify a permission type. The permission type may include the function of the permission, for example, read, write, delete, create, list, describe, get, enable, tag, untag, deactivate, add, update, attach, etc. Permission type may also identify the frequency of use of the permission by a specific identity (self-frequency) or the frequency of usage of the permission by multiple identities (general frequency).

At step 505, process 500 may identify a target sensitivity. In some embodiments, the target sensitivity may be based upon a predefined classification of sensitivity. Predefined classifications of sensitivity may include publicly available resources, restricted resources, or restricted resources with secret data. Classifications may be defined such that most sensitive resources are given a higher classification score. The target sensitivity may also include a sensitivity score determined for the target resource. In further embodiments, the target sensitivity may be based on the size of the target resource. As discussed above with respect to FIG. 2, a smaller target resource may be less sensitive to attack.

At step 506, process 500 may identify one or more custom risk factors. In some embodiments, a custom risk factor may address whether the permission corresponds to a designated sensitive administrator privilege. As discussed above with respect to FIG. 2, a sensitive administrator privilege may be, for example, one that gives the identity full administrative or root power over the entity or the ability to create additional users. In some embodiments, the customized risk factor may address whether the permission corresponds to a designated sensitive target network resource. For example, a designated sensitive target network resource may be a database containing highly sensitive or secret information or an authentication resource that controls access to multiple entities. Such designated sensitive target resources may warrant greater security and may thus receive higher risk scores. In yet further embodiments, the customized risk factor may address whether the permission corresponds to a historical attack permission. A historical attack permission may be, for example, a permission that has been used in one or more previous malicious attacks waged on the corresponding entity or on other entities or environments. The custom risk factor may also correspond to a security status of the entity. In some embodiments, entities with greater security measures already in place may receive a lower score, indicating they are less susceptible to attack. For example, an entity with systems in place such as multi-factor authentication or CyberArk's Privileged Access Security™ Solutions may receive a lower score than entities without such security measures in place.

At step 507, process 500 may develop a result of the composite risk assessment for the permission. The result may be based upon the one or more permission attributes identified in steps 504-506. For each permission attribute identified in any one of steps 504-506, process 500 may create a corresponding potential damage score, as discussed above with respect to FIGS. 2-4. In some embodiments, the result may be a combination of the permission type, target sensitivity, or custom risk factor scores. Such a score may be calculated by assigning different weights to the permission type, target sensitivity, or custom risk factor scores and combining them into a single weighted score.

At step 508, process 500 may perform a security response based on the composite risk assessment. In some embodiments, based upon the score generated at step 507, process 500 may proceed to one or more of steps 509-512. In some embodiments, two or more of steps 509-512 may be performed simultaneously. In other embodiments, the steps may be performed sequentially. In yet further embodiments, process 500 may perform just one of steps 509-512.

At step 509, process 500 may classify the relevant permission. For example, based on the calculated score, the permission may be classified as a high-risk permission that likely needs to be removed. In other cases, the permission's score may be relatively low, which may cause it to be classified as, for example, a low-risk permission, which may not need to be altered.

At step 510, process 500 may reduce privileges associated with the permission. In some embodiments, if the score is relatively high, privileges for the corresponding identity might be reduced.

At step 511, process 500 may compare the score associated with the permission to a score of a permission associated with another identity. In some embodiments, the score associated with the permission may be compared to a score associated with another permission of the same identity. Such a score comparison may be possible because the scores for each permission are normalized. In some embodiments, process 500 may prioritize security responses based upon the comparison. For example, two scores corresponding to permissions from two different identities may be compared. The permission with the higher score, thus presenting a higher damage risk, may be prioritized such that it would be addressed first.

At step 512, process 500 may generate an output, such as a security report, alert, or least-privilege damage score report. In some embodiments, the output may be transmitted to security server 105. Security server 105 may evaluate the output and determine whether to take action and, if action is warranted, what action to take. For example, security server 105 may receive a least-privilege damage score report indicating that one entity has several unused high-risk permissions capable of causing great damage. The security server 105 may then cause those permissions to be revoked. In some embodiments, evaluations of the output and corresponding actions may happen automatically without sending the output to security server 105.

It is to be understood that process 500 may be performed for single permissions or multiple permissions. In some embodiments, process 500 may be performed for multiple permissions simultaneously. In further embodiments, process 500 may access multiple permissions at step 501 and may execute the process 500 for the multiple permissions, creating aggregate scores as described with respect to FIGS. 2-4. For example, process 500 may be conducted for all permissions present within a certain entity, or an entire network environment.

Figure 6:
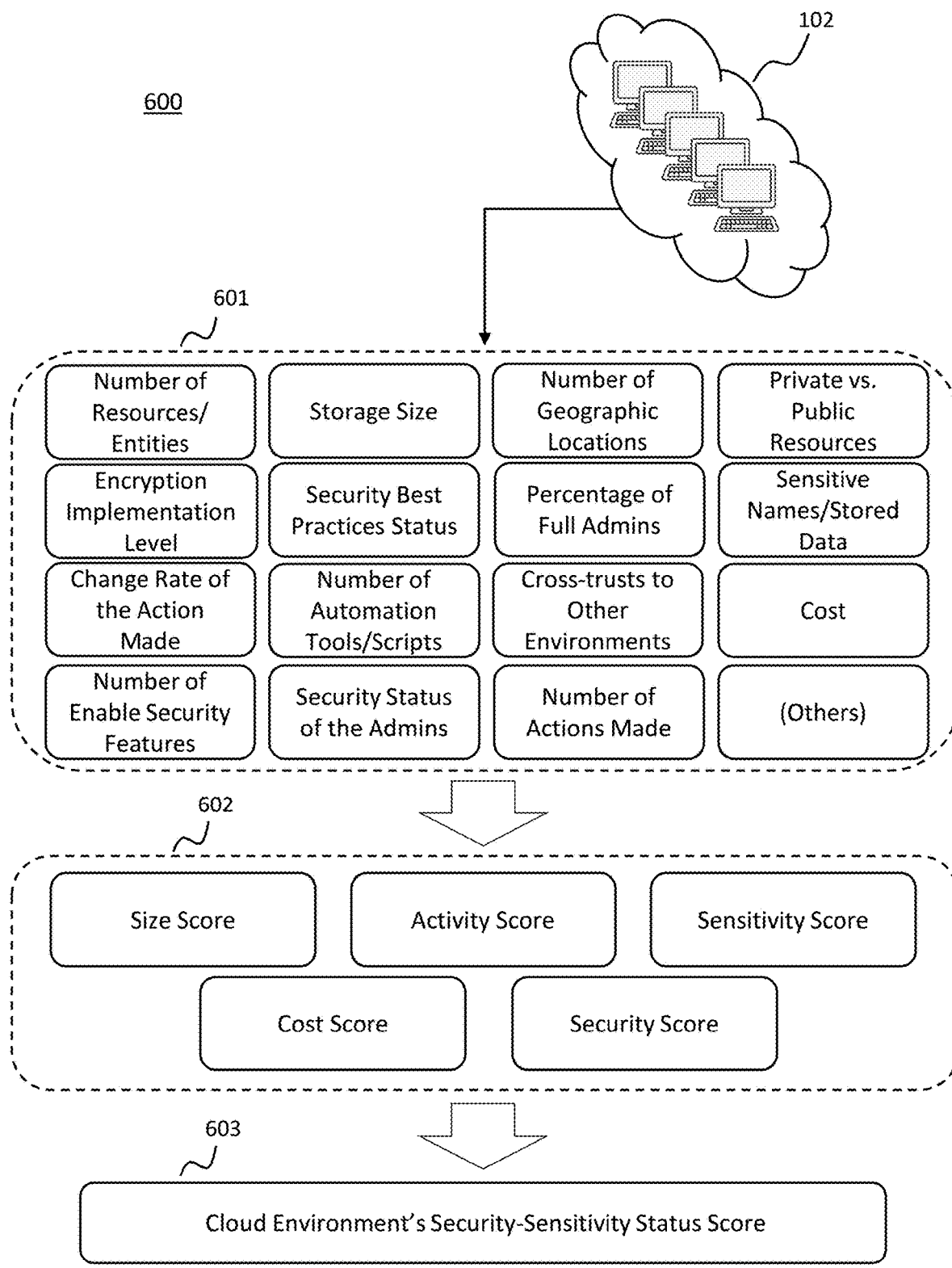
FIG. 6 is an illustration depicting components of a security-sensitivity status score.

FIG. 6 is an illustration 600 depicting components of a security-sensitivity status score. A security-sensitivity status score may be a normalized score that quantifies the extent of security risk associated with a cloud computing environment 102, consistent with above embodiments. The security-sensitivity status score may also indicate a level of relative importance of a cloud computing environment compared to other cloud computing environments. For example, security-sensitivity status scores for multiple environments may be compared and used to prioritize between environments to address the security concerns of the most critical or highest risk environments first. As described in greater detail below, security-sensitivity status scores may be calculated using one or more component attribute scores.

An organization may have many associated cloud computing environments. For example, some large organizations may have hundreds of different cloud computing environments spread across multiple cloud computing providers, such as AWS™, Azure™, and Google Cloud Platform™, each running in parallel to execute the many computing functions used within the organization.

As described above, each cloud computing environment may contain a variety of computing resources, entities, identities, code instances, etc. Each of the components and different attributes of a cloud computing environment may affect the environment's importance to an organization or present a higher level of security risks.

Group 601 of FIG. 6 illustrates some of attributes of an environment that may ultimately affect is security sensitivity or importance. These attributes may be used to calculate component attribute scores illustrated by group 602. Attributes 601 of an environment may include the number of resources, entities, or identities associated with the environment, for example, the number of users, groups, roles, virtual machines, storage resources, serverless functions, code instances, containers, etc. Attributes 601 may also include a storage size or amount of data stored within the environment. Other attributes may include the number and frequency of actions taken within the environment (e.g., read, write, upload, modify, copy, request, instantiate, delete, etc.), the change rate of the number of actions, the geographic locations associated with the environment, the size of the environment's logs, the number of automation tools and scripts being used, and the number of cloud services used within the environment. Further attributes may include whether resources are public or private, whether the environment includes cross trusts to other environments, implementation of encryption, keywords within names of resources and entities, the presence of sensitive data stored within the environment, the monetary cost of the environment to the organization, current security implementation within the environment, the number of security features enabled, the number of identities with full administrative privileges, the security status of the administrative identities, the presence of specific security products within the environment, the number and strength of security/permission policies within the environment, whether the environment is associated with other credential or session management services within the environment, and others. In some embodiments, each attribute of an environment may have a corresponding attribute score.

Group 602 illustrates component sub-scores that may be calculated based on attributes of an environment. For example, for each environment associated with an organization, one or more of a size score, an activity score, a sensitivity score, a cost score, and a security score may be calculated. While this list is not exhaustive, each of the exemplary sub-scores listed are discussed in greater detail below. The magnitude of each score may indicate a level of security risk or importance associated with the attributes that are analyzed to calculate the score. In some embodiments, one or more of the sub-scores may be automatically assigned. For example, a machine learning algorithm may be used to learn and identify the attributes associated with each score, and then assign attribute scores and component sub-scores based upon that information. In some embodiments, one or more of the component sub-scores may be manually configured.

A size score may represent a size attribute of an environment. The size score may indicate a security sensitivity or relative importance of the environment compared to other environments based on size-related attributes of the environment. The size score may be determined based on the number of resources, entities, identities, users, groups, roles, virtual instances, storage resources, serverless functions, code instances, containers, etc. within the environment. In some embodiments, the size score may be determined based on an amount of storage capacity, a file size, or an amount of data stored with the environment. For example, an environment with a large number of resources and entities, or a large amount of data stored, may be more important to the functioning of the organization than environments with a small number of associated entities or a small amount of stored data. Similarly, environments with a larger number of associated identities and resources may present a larger attack surface and may therefore be more sensitive to attacks. Accordingly, environments with a large number of constituent entities or stored data may have a relatively high size score.

An activity score may represent an activity level of an environment. The activity score may indicate a security sensitivity or relative importance of the environment compared to other environments based on activity-related attributes of the environment. The activity score may be determined based on a number actions taken within the environment, a frequency of actions taken within the environment (e.g., the number of actions occurring with a certain period of time, or an average number of actions taken within a certain amount of time, etc.), a change in the number or frequency of actions taken within the environment, or a change rate of the number or frequency of actions, etc. Additionally or alternatively, the activity score may also be based on the geographic locations associated with actions of the environment (e.g., whether actions are only taken from the United States, from a particular city, or whether actions are taken from other locations), a file size associated with actions of the environments (e.g., log files), a number of automation tools and scripts being used to execute any actions, and the number of other cloud services used within the environment. For example, a large number of actions taken, a high frequency of actions, or worldwide usage may indicate that the environment is relatively more important or security critical. Similarly, large log files may indicate a high usage or number of actions. Likewise, a high number of automation tools, scripts, or cloud services in use by an environment may indicate that a large amount of time and/or resources were spent setting up the environment, which may indicate a higher importance of the environment. Accordingly, environments with high activity reflected by these attributes may have a relatively high activity score.

A sensitivity score may represent a sensitivity level of an environment. The sensitivity score may indicate a security sensitivity or relative importance of the environment compared to other environments based on sensitivity-related attributes of the environment. The sensitivity score may be determined based on a number of resources within the environment that implement privileged access restrictions (e.g., the number of resources that are public as compared to the number of private resources in the environment). For example, having a large number of access-restricted private resources may indicate that the environment is more sensitive than an environment with a large number of public (non-access-restricted) resources. Additionally or alternatively, the sensitivity score may be based on an encryption implementation level of the environment (e.g., a number of resources that use encryption, the strength of the encryption method, the number of identities with access to the encryption keys, etc.). For example, a high level of implementation of encryption within the environment may indicate that the environment contains a relatively higher amount of encrypted data. In some embodiments, the sensitivity score may be based on whether the environment is cross-trusted with one or more other environments. For example, a first environment may have an administrative relationship over a second environment, which may indicate that the first environment has an increased sensitivity. In some embodiments, the sensitivity score may be based on the amount of encrypted data known to be stored within the environment. For example, a regular expression check may be used to identify files or databases containing data with sensitive words (e.g., "classified," "confidential," "internal use," etc.) or sensitive types of data (e.g., Social Security Numbers, ID numbers, credit card numbers, etc.). Similarly, the sensitivity score may be based on a presence of a particular textual or numerical character string of resources within the environment. For example, resources including "prod" in their names may indicate that they are sensitive production-related resources and may be more important to the organization than resources or entities with "test" in their names, which may indicate that those resources are used for testing or development purposes and are less critical. Accordingly, environments with high sensitivity reflected by these attributes may have a relatively high sensitivity score.

A cost score may represent a cost associated with the environment. A cost score may represent a cost level of an environment. In some embodiments, the cost score may indicate a financial or monetary cost to an organization of maintaining the environment. For example, the cost score may indicate a relative level of a monthly or yearly payment to a service, such as AWS™, for maintaining the environment. Additionally, or alternatively, the cost score may be based on an amount of resources or personnel dedicated to maintaining the environment. A higher cost may indicate a more important or sensitive environment because the organization may be willing to pay more for the more sensitive environment. Accordingly, environments that have a high associated cost may have a relatively higher cost score.

A security score may represent a security level of an environment. The security score may indicate a security sensitivity or relative importance of the environment compared to other environments based on security-related attributes of the environment. The security score may be based on whether the environment implements certain security best practices or benchmarks (e.g., Center for Internet Security (CIS) Benchmarks). In some embodiments, the security score may be based on a number of enabled security techniques of the environments (e.g., whether multi-factor authentication ("MFA") is enabled, the number or percentage of users that use MFA, whether logs are enabled, presence of other security products in the environment, etc.). Additionally, or alternatively, the security score may be based on the number or percentage of identities with full administrative privileges within the environment. For example, a high percentage of users with full administrative privileges may indicate that the environment is less secure and less important than environments with a limited number of identities with full administrative privileges. The security score may also be based on the security status of the administrative identities (e.g., whether the administrative identities use MFA, the age of the passwords or other credentials associated with the administrative identities, whether the identities implement some form of periodic credential rotation, etc.). Additionally, or alternatively, the security score may be based on security policies within the environment. For example, environments with more restrictive security policies, such as those that limit assignment of certain privileges, may be more secure that those with less strict policies. Similarly, in some embodiments, the security score may be based on a number or percentage of privileged identities within the environment. In some embodiments, the security score may be based on whether the environment is associated with other privileged access, credentials, or session management services (e.g., Azure's Active Directory Privileged Identity Management™, AWS Identity and Access Management™, CyberArk Vault™, CyberArk Privileged Session Management™, CyberArk Conjur™, CyberArk's Privileged Access Security™, IBM's Security Privileged Identity Manager™, or various others). For example, if user connections are made using a credential management service, the environment may be more secure. Accordingly, environments with high security levels reflected by these attributes may have a relatively high security score.

Each of the component sub-scores in group 602 may be calculated based on one or more of the environment attributes of group 601 described above. For example, an individual attribute score may be calculated for each one of the attributes illustrated in group 601. In some embodiments, attribute scores may be normalized based on the attributes of multiple environments. For example, attribute scores may be calculated such that they fall between 0 and 1, with the average score across the multiple compared environments being 0.5, minimum score being 0, and the maximum score being 1. An exemplary calculation of attribute scores is shown below.

As an example, an organization may have 4 environments (Env1, Env2, Env3, and Env4) which it wishes to compare and calculate a security-sensitivity status. One of the analyzed attributes of the environments may be the number of users. Env1 may have 100 users, Env2 may have 200 users, Env3 may have 50 users, and Env4 may have 150 users. Thus, Env3 represents the minimum number of users and Env2 represents the maximum number of users among the environments being compared. Env3 may have a corresponding user attribute score of 0, while Env2 may be assigned a user attribute score of 1. The first and fourth environments may be assigned user attribute scores based on where they fall within the minimum to maximum range (50 to 200), for example by using the following normalization equation, where EnvX is the number of users in the environment for which the user attribute score is to be calculated:

$$\text{User Attribute Score} = \frac{(EnvX - \text{Minimum Number of Users})}{\left(\frac{\text{Maximum Number of Users} -}{\text{Minimum Number of Users}}\right)}$$

Accordingly, the user attribute score for Env1 may be obtained by using the following expression:

$$\frac{(100-50)}{(200-50)} = 0.33.$$

Similarly, the user attribute score for Env2 may be calculated $$\left(\frac{(150-50)}{(200-50)} = 0.67\right).$$

While this example illustrates attribute scores for environments based on the number of users within the environments, attribute scores may be similarly calculated for any environment attributes described above. Note that this score calculation and the others provided below, including the equations illustrated and the relative numbers of the calculation, are merely exemplary. Many different equations and score calculations are possible, and the disclosed embodiments are not limited to the equations described. Moreover, while the scores are illustrated as decimal numerical values, other forms of scores are possible as well, such as, percentages.

In some embodiments, (e.g., for attributes that may not correspond to easily identified quantitative values, such as an encryption implementation level or the mere presence of certain factors), attribute scores may be assigned a score based on a predefined scale. For example, an attribute score relating to a level of encryption implementation may be assigned based on a predefined scale of 1-10. In some embodiments, one or more of the scores may be a value that is preconfigured based on a corresponding attribute or environment.

In some embodiments, attributes may be identified and attribute scores may be assigned manually. Additionally, or alternatively, attributes may be identified and attribute scores may be assigned automatically based on, for example, a machine learning algorithm. For example, a machine learning system may be used to inspect attributes of certain environments and calculate corresponding attribute scores. The machine learning system may be configured to dynamically update attribute scores as environments change over time.

Component sub-scores 602 may be calculated using one or more of the attribute scores corresponding to attributes 601. The attribute scores of attributes corresponding to each component sub-score may be weighted and aggregated to calculate the corresponding component sub-score. For example, the attribute scores for the number of users and the amount of stored data in an environment may be weighted and aggregated to calculate the environment's size score. To calculate the aggregate component sub-scores 602, each attribute within group 601 may be assigned an absolute or relative weight. For example, the more attributes may receive a weight of 50, while the less critical attributes may receive a weight of 5. The component sub-score 602 may then be calculated using the different attribute scores, which may be weighted and normalized into a single score using, for example, the following equation:

$$\frac{(weight1 * AttributeScore1) + (weight2 * AttributeScore2) + (weight3 * AttributeScore3)}{weight1 + weight2 + weight3}$$

In some embodiments, the weights for each attribute may be configured manually. In some embodiments, the weights may be configured automatically. For example, a machine learning system may be configured to assign weights to various attributes or attribute scores. The machine learning system may be configured to dynamically update the weights over time. For example, the machine learning system may change attribute weights based on feedback from calculated security-sensitivity scores or user input.

Continuing the example of calculated attribute scores described above, component sub-scores may be calculated using the above equation. Thus, from the above example, Env1 may have a user number attribute score of 0.33. Env1 may also have a data storage attribute score of 0.1 (e.g., indicating a relatively low amount of stored data in the environment). For exemplary purposes, the number of users may be weighted slightly higher than the amount of data stored in the environment. Weight1 (corresponding to the number of users) may be 60, while weight 2 (corresponding to the amount of stored data) may be 40. Accordingly, a size score for Env1 may be calculated as follows:

$$\text{Size Score}_{Env1} = \frac{(60*0.33) + (40*0.1)}{60+40} = \frac{24}{100} = 0.24$$

Each of the other component sub-scores 602 may be calculated in a similar manner. As described above, the equations used to calculate component sub-scores 602 are exemplary. The disclosed embodiments are not limited to these specific equations. Moreover, other forms of scores are possible in addition to those illustrated. In some embodiments, component sub-scores 602 that correspond to an environment may be combined to form the environment's Security-Sensitivity Status Score 603. The environment's Security-Sensitivity Status Score 603 is described in greater detail with respect to FIGS. 7 and 8, below.

Figure 7:
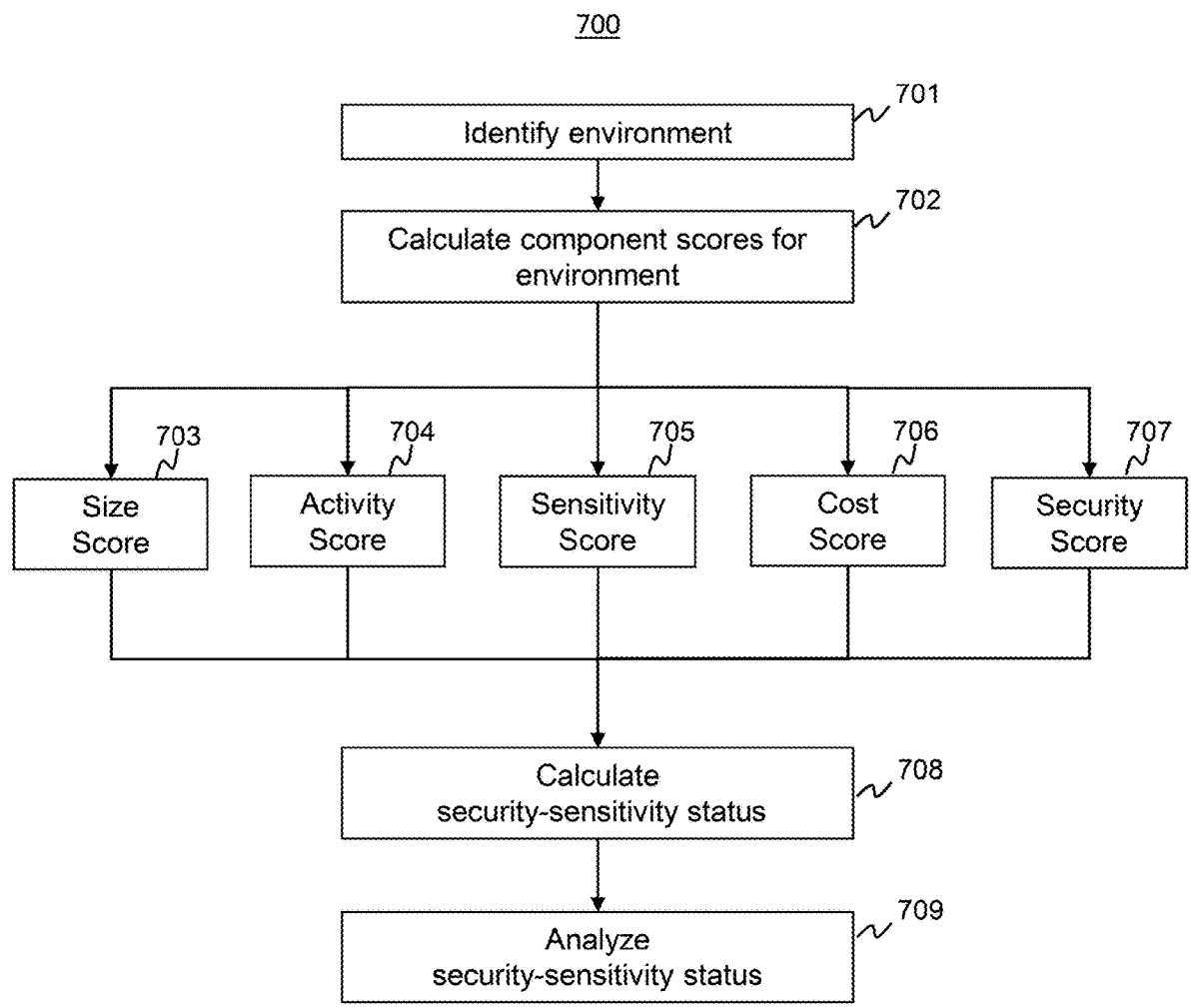
FIG. 7 is a flowchart depicting an exemplary process for calculating a security-sensitivity status and analyzing a computing environment.

FIG. 7 is a flowchart depicting an exemplary process 700 for calculating a security sensitivity status and analyzing a computing environment. Process 700 may be carried out by, for example, security server 105 as discussed above in connection with FIG. 1 and above embodiments.

At step 701, process 700 may include identifying a cloud computing environment. The cloud computing environment may identify one of multiple environments associated with an organization. Consistent with the discussion above, this may include accessing a cloud computing service (e.g., AWS™, Google Cloud Computing Services™, Microsoft Azure™, etc.).

At step 702, process 700 may calculate one or more component sub-scores for the environment. Component sub-scores 602 may be calculated based on one or more attributes 601 of the environment as described above with respect to FIG. 2. Calculated component sub-scores 703-707 may include a size score 703, an activity score 704, a sensitivity score 705, a cost score 706, and a security score 707, each corresponding to different attributes of the environment.

At step 708, process 700 may include calculating a security-sensitivity status score 603. In some embodiments, security-sensitivity score 603 may be expressed as a numerical value (e.g., between 0 and 1, or 1 and 100). In other embodiments, security-sensitivity score 603 may expressed as, for example, a percentage, a level, a category, etc. In some embodiments, security-sensitivity status score 603 may be calculated using a weighted aggregation of the component sub-scores 703-707. Thus, some component sub-scores may be weighted higher to give more importance to those sub-scores in the ultimate security-sensitivity status score 803. For example, the sensitivity score 705 may be more positively correlated with the security-sensitivity status score than the size score, and therefore may be weighted more heavily. The exemplary formula below may be used to calculate the security sensitivity status score using component sub-scores 703-707 and corresponding weights $W_1$-$W_5$.

$$\frac{(W_1 * \text{Size}) + (W_2 * \text{Activity}) + (W_3 * \text{Sensitivity}) + (W_4 * \text{Cost}) + (W_5 * \text{Security})}{W_1 + W_2 + W_3 + W_4 + W_5}$$

While the exemplary expression shown above for calculating security-sensitivity status scores includes each of scores 703-707, in some embodiments, fewer sub-scores may be used. Additionally, the security-sensitivity status score is not limited to being calculated with only sub-scores 703-707. For example, component sub-scores relating to other attributes of an environment may be generated and used to calculate security-sensitivity status score. As another example, an environment's least-privilege damage score 403 (e.g., as described with respect to FIG. 4 above) could be included in the calculation the environment's security-sensitivity status score. As described above, the equation provided to calculate the security sensitivity status score is merely exemplary. Other variations are possible; the disclosed embodiments are not limited to these specific equations.

In some embodiments, the weights for each component sub-score may be configured manually. In some embodiments, the weights may be configured automatically. For example, a machine learning system may be configured to assign weights to various component sub-scores. The machine learning system may be configured to dynamically update the weights over time. For example, the machine learning system may change component sub-score weights based on feedback from calculated security-sensitivity scores or user input.

At step 709, process 700 may include analyzing the security-sensitivity status calculated at step 708. In some embodiments, analyzing the security-sensitivity status may include identifying a security-sensitivity status gap. The security-sensitivity status gap is described in greater detail with respect FIG. 8 below. In some embodiments, analyzing the security-sensitivity status may include generating a status report. The status report may include the security-sensitivity status score, a security-sensitivity status gap, security-sensitivity status scores for other environments, comparisons between security-sensitivity status scores of different environments, recommended changes to one or more environments, etc. Security server 105 may transmit the report to another device, for example, client device 101, or another server running a network security platform.

In some embodiments, analyzing the security-sensitivity status score may include generating a graphic user interface providing a visual representation of the security-sensitivity status score. The visual representation may include the security-sensitivity status score of the environment, security-sensitivity status scores of other similar or dissimilar environments, non-numerical depictions of the scores, etc. For example, a visual representation of security-sensitivity status scores for multiple environments may be created that includes graphs or status bars that indicate the relative differences between the security-sensitivity status scores of the different environments. In some embodiments, the differences may be illustrated by using different sizes, colors, shapes, etc. of the graphics visual representation.

In some embodiments, analyzing the security-sensitivity status score may include comparing the calculated security-sensitivity status score with security-sensitivity status scores corresponding to environments outside of the organization. For example, the environment identified at step 701 may be associated with a bank. After calculating the security-sensitivity status score for the bank's environment, the security server may compare that score with security-sensitivity status scores corresponding to similar environments associated with other banks. This comparison may give the organization insight to information about its system or environment it would not otherwise have had by merely analyzing the environment internally.

In some embodiments, analyzing the security-sensitivity status score may include consolidating security-sensitivity status scores of multiple environments into a single consolidated score. Consolidating security-sensitivity status scores may include, for example, aggregating multiple scores, averaging multiple scores, or calculating a weighted average of the scores. For example, an organization may have several different departments, each with many of its own different environments, which may be spread across several different cloud computing providers, networks, etc. Accordingly, consolidated scores could be created for each of the departments within the organization. The consolidated scores may facilitate comparisons between the departments within the organization to identify the most security-sensitive departments or to identify which departments are highest risk and thus should prioritized when budgeting or assigning resources to departments.

In some embodiments, analyzing the security-sensitivity status score may include updating machine learning models. For example, machine learning models used to generate weights for component sub-scores or attribute scores may be updated based on the calculated security-sensitivity status score or comparisons between the calculated score and scores corresponding to other environments. As another example, a machine learning model may be updated based on comparisons between the calculated security-sensitivity status score and previously calculated scores for the same environment (e.g., scores calculated based on different component sub-scores, different sub-score weights, or different attributes).

Figure 8:
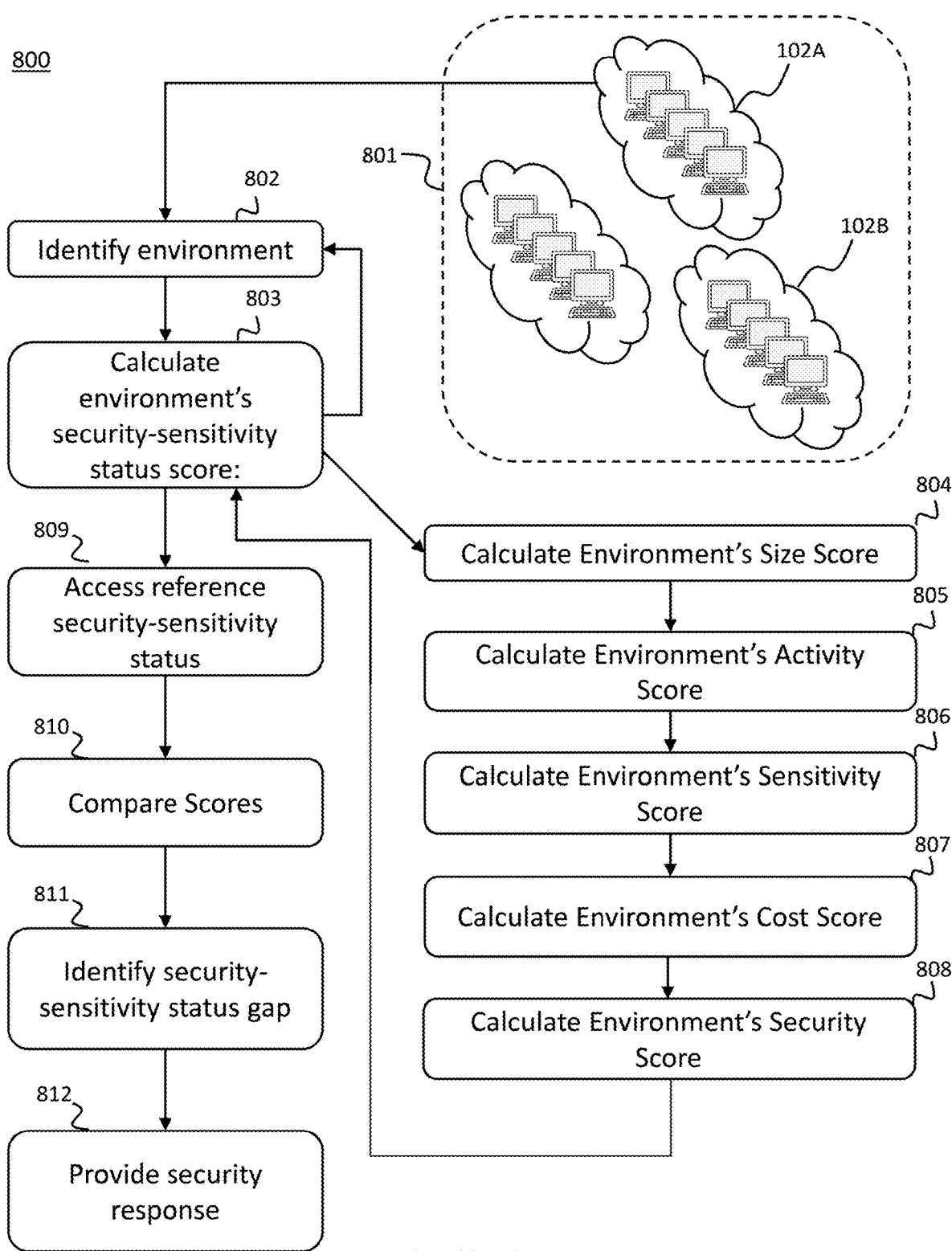
FIG. 8 is a flowchart depicting an exemplary process for identifying a security-sensitivity status gap and providing a security response.

FIG. 8 is a flowchart depicting an exemplary process for identifying a security-sensitivity status gap and providing a security response. Process 800 may be carried out by, for example, security server 105. At step 802, process 800 may include identifying a cloud computing environment 102A. The cloud computing environment may identify one of multiple environments 102 associated with an organization 801. Organization 801 may be an organization, a department or subgroup within an organization, or the like. For example, organization 801 may be a company, bank, law firm, etc. As another example, organization 801 may be a subgroup or department within a company, such as a legal department, a research and development department, or a financial/accounting department. Consistent with the discussion above, identifying an environment 102 may include accessing a cloud computing service (e.g., AWS™, Google Cloud Computing Services™, Microsoft Azure™, etc.).

At step 803, process 800 may calculate a security-sensitivity status score for environment 102A based on one or more component sub-scores for the environment. At step 803, process 800 may iterate through a plurality of sub-steps, 804-807, to calculate the component sub-scores for each environment. Component sub-scores may be calculated at steps 804-808 as described above with respect to FIGS. 8 and 7. The component scores may be used to calculate the environment's security-sensitivity status score as described above with respect to FIGS. 6 and 7.

In some embodiments, after completing step 803 and calculating environment 102A's security-sensitivity status score, security server 105 may go back to step 802 and identify a second environment 102B associated with organization 801. Security server 105 may then proceed to step 803 of process 800 and calculate a security-sensitivity status score for environment 102B. To calculate the security-sensitivity status score for environment 102B, security server 105 may calculate one or more component sub-scores at steps 804-808. The component sub-scores and security-sensitivity status score may be calculated as described above with respect to FIGS. 6 and 7.

In some embodiments (not depicted in FIG. 8), multiple security-sensitivity status scores corresponding to different environments (102A, 102B) may be consolidated into a single consolidated score. Consolidating security-sensitivity status scores may include, for example, aggregating multiple scores, averaging multiple scores, or calculating a weighted average of multiple scores. For example, an organization may have several different departments, each with many of its own different environments, which may be spread across several different cloud computing providers, networks, etc. Accordingly, consolidated scores could be created for each of the departments within the organization. The consolidated scores may facilitate comparisons between the departments within the organization to identify the most security-sensitive departments or to identify which departments are highest risk and thus should prioritized when budgeting or assigning resources to departments.

At step 809, process 800 may include accessing a reference security-sensitivity status score. The reference security-sensitivity status score may correspond to a minimum or an optimal security-sensitivity status score. For example, a minimum security-sensitivity status score may represent a minimum threshold that an environments score must exceed in order for security server 105 to not take or recommend certain remedial actions. In some embodiments, the reference security-sensitivity status score may be obtained from or correspond to an environment that is separate and independent from the one or more environments identified at step 802. The separate and independent environment may not be associated organization 801. As an example, organization 801 and environments 102A, 102B may be associated with a first bank, but the separate and independent environment associated with the reference security-sensitivity status score may be associated with a second bank. In some embodiments, the separate and independent environment may be determined to be similar to the environments 102A and/or 102B, etc. For example, if a security-sensitivity status score is calculated for environment 102A that is primarily a data storage environment, security server 105 may select a reference score from another similar data storage environment. As another example, if environment 102A is associated with a company, security server 105 may select a reference score from another similar company.

In some embodiments, the reference security-sensitivity status score may correspond to an organization including multiple environments (e.g., a consolidated reference security-sensitivity status score). A consolidated reference security-sensitivity status score may be obtained from or correspond to an organization that is separate and independent from organization 801, which contains the one or more environments identified at step 802.

In some embodiments, reference security-sensitivity status score may be stored locally on security server 105. In other embodiments, security server 105 may request a reference security-sensitivity status score from another computing device or resource.

In some embodiments, step 809 may include accessing a reference environment prioritization list. The reference environment prioritization list may indicate a prioritization of environments within organization 801. The reference prioritization list may list environments in order of importance to organization 801, in order of resources invested for each environment, in order of security risk presented by each environment, in order of security measures implemented in each environment, etc. In some embodiments, the reference prioritization list may be manually created by, for example, an administrator or officer of organization 801. In other embodiments, the reference prioritization list may be automatically created. In yet further embodiments, the reference prioritization list may be created through a combination of both manual and automatic action. For example, an initial reference prioritization list may be automatically created, but then may be edited manually by an administrator based on the organization's leaders' opinions of the importance of certain environments.

In some embodiments, the reference prioritization list may correspond to prioritizations from one or more other organizations. The other organizations may be similar to organization 801 or have similar environments to environments 102A and 102B. For example, if security server 105 is associated with a third-party security platform, it may inspect the environments of many different organizations. It may use data gained from these varied environments to generate average or recommended reference prioritization lists. As an example, security server 105 may determine after analyzing many organizations that are similar to organization 801 that a majority of other organizations prioritize Environment X (or an environment similar to X) as one of their top three environments. Accordingly, security server may generate a recommended reference prioritization list that prioritizes Environment X in the top three environments. In some embodiments, security server 105 may access a reference prioritization lists that corresponds to a single outside organization but is representative of several other organizations.

Step 809 is not limited to accessing a single reference security status. In some embodiments, at step 809 of process 800 may include accessing multiple reference security statuses. For example, security server 105 may access two reference prioritization lists at step 809 (e.g., a first list corresponding to organization 801 and a second list corresponding to one or more other organizations).

At step 810, process 800 may include comparing the one or more security-sensitivity status scores calculated at step 803 with the reference security-sensitivity status score accessed at step 809.

In some embodiments, step 810 may include generating a security-sensitivity status priority list. The security-sensitivity status priority list may indicate, for example, the environments that are most important to organization 801 or that should be allocated resources first. The security-sensitivity status priority list may be created based on the security-sensitivity status scores calculated for each environment at step 803. For example, the list may be created such that the environment with the highest score (indicating a highest importance or security sensitivity) may be listed first, the second highest score may be listed second, the third highest score may be listed third, and so on. At step 810, process 800 may include comparing the generated security-sensitivity status priority list with the reference prioritization list accessed at step 809.

At step 811, process 800 may include identifying a security-sensitivity status gap. The security-sensitivity status gap may be identified based on the comparison made at step 810. In some embodiments, the security-sensitivity status gap may be the difference between an environment's security-sensitivity status score and the reference security-sensitivity status score. The security-sensitivity status gap may indicate the difference between the security controls actually exercised by the organization (e.g., the reference security-sensitivity status or reference prioritization list accessed at step 809) and the controls that should be exercised by the organization (e.g., a security-sensitivity status calculated at step 803 or a security-sensitivity status priority list generated at step 810).

In some embodiments, the security-sensitivity status gap may be the difference (or differences) between a generated security-sensitivity status priority list and a reference prioritization list. For example, the security-sensitivity status gap may indicate which environments are currently over-prioritized, under-prioritized, allocated with too many resources, allocated with too few resources, which environments may be redundant, which environments should receive additional security measures, etc. As another example, when the reference prioritization list corresponds to an outside organization or organizations (e.g., is not associated with organization 801), the security-sensitivity status gap may indicate the difference between environments prioritized by organization 801 and environments prioritized by others. Thus, through analyzing the security-sensitivity status gap, organization 801 may gain unique insight into potential weaknesses in its system and adjust its security controls accordingly.

At step 812, process 800 may include providing a security response. In some embodiments, the security response may include generating a report. The report may include, for example, one or more of: the security-sensitivity status gap, an identification of one or more environments identified at step 802, the security-sensitivity status scores corresponding to the environments, reference security-sensitivity status scores, a generated security-sensitivity status priority list, a reference prioritization list, and security recommendations. In some embodiments, the report may also include specific information relating to the identified environments, such as what security controls are currently in place within the environment, entities within the environment, information relating to various attributes 601 of the environment, component sub-scores 602 corresponding to the environment, etc.

In some embodiments, the security response may include transmitting data to a network security platform. The network security platform may be a platform of organization 801 that manages the environments within organization 801. The data may include the security-sensitivity status gap, security-sensitivity status scores corresponding to the environments, reference security-sensitivity status scores, a generated security-sensitivity status priority list, a reference prioritization list, data corresponding to security recommendations. In some embodiments, the data may include specific data about one or more environments, such as data regarding the security controls currently in place within the environment, entities within the environment, information relating to various attributes 601 of the environment, component sub-scores 602 corresponding to the environment, the environment's provider, the environments administrators, data regarding previous security breaches of the environment, etc.

In some embodiments, the security response may include generating security recommendations. The security recommendations may include one or more actions to be taken, automatically or manually, to remediate the security-sensitivity status gap. Actions may include, for example, reallocating resources between environments (e.g., monetary funding, processing power, hardware, manpower, etc.), implementing new security controls or policies within environments, (e.g., least-privilege controls, MFA, etc.), deactivating an environment, and others. In some embodiments, security recommendations may be based on one or more component sub-scores 602 or attributes 801. For example, based on the security-sensitivity status gap, security server 105 may determine that actions should be taken to remediate the gap of environment 102A. Security server 105 may analyze the component sub-scores 602 of environment 102A to determine where the gap is likely to have originated. As an example, if environment 102A has a relatively low security score, security server 105 may recommend implementing a privileged access security system or multi-factor authentication to increase the security of environment 102.

In some embodiments, the security response may include generating a selectable prompt for remediating the security-sensitivity status gap. For example, security server 105 may generate a GUI in which it may provide a selectable prompt to an administrator of organization 801. The selectable prompt may give the administrator the ability to select an action from one or more security recommendations based on the security-sensitivity status gap.

In some embodiments, the security response may include automatically remediating the security-sensitivity status gap. Automatically remediating the security-sensitivity status gap may include automatically implementing one or more of the security recommendations described above. For example, if the security-sensitivity status gap indicates that an environment does not have sufficient security controls or has too many identities with a large number of sensitive unused privileges, security server 105 may automatically implement a least-privilege security policy for the environment.

Potential use cases of the disclosed embodiments are described below. It is understood that these exemplary use cases are provided by way of example only and are not limiting of the present disclosure.

One potential implementation may be to address the least-privilege security problem of a database containing highly sensitive information. A user may use a computing device (e.g., a laptop computer) to access the database hosted in a cloud computing network. The computing device, database, and cloud computing network may also be in communication with a security server that manages secure access to the database. Using the laptop computer, the user may request access to the database. In response, the security server may request that the user be authenticated using some type of identifier, such as a user account and password or biometric authentication. If user's credentials are valid, the security server may authorize access to the user. The user's account may have a number of different permissions associated with it. For example, the user may be able to read the information contained on the database. Users with administrative accounts may have more permissions, such as the ability to delete information from the database or create new authorized users.

In order to increase security and limit its potential attack surface, the system may run a least-privilege damage check on the system, calculate one or more least-privilege damage scores, and act accordingly based upon the resulting scores. This may occur automatically before the identity is permitted to access the database, periodically, or otherwise. The system may identify all of the relevant permissions associated with the identity. The system may then choose a specific permission and identify if it is used by the corresponding user's identity. If unused, the system may then identify a number of attributes for that permission, for example, the type of permission, the permission's self-frequency, and the permission's general frequency. The system may then calculate a least-privilege damage score based upon the permission's type attributes. For example, if the unused permission selected is a "delete" permission, the identity has never used a delete or similar permission, and delete permissions are rarely used by any other identities associated with the database, the permission type score may be relatively high, indicating that the permission is high risk.

The system may also identify attributes of the database (the target resource) and calculate a score based on those attributes. For example, the system may identify that the resource is for data storage, is specifically a database, and contains sensitive information. The system may also identify that the resource is relatively small because the identity credentials relate to only a single database. Accordingly, the system may create a weighted score related to the target resource.

The system may further create a third least-privilege damage score relating to other special risk factors, such as the risk of shadow admins, the specific permission's frequency in attacks, whether the target resource is identified as especially sensitive, and the security status of the resource. This score may be particularly high for the database in this example because it could be identified as an especially sensitive resource because it contains sensitive or secret information.

The system may then calculate the permission's overall least-privilege damage score by combing the permission's type score, the target resources score, and the special risk factors score. The system may repeat this process for each of the unused permissions associated with the identity. Then the system may compare the scores of each permission and identify the most at-risk unused permission. The system may then address the problem by revoking the highest risk permission first. In this example, an unused delete permission associated with the user's identity may be revoked if the user has never used it because the delete permission may present a high risk to the system if access is obtained by a malicious user that wishes to destroy important data stored on the database.

In scenarios where there are multiple secure resources, such as multiple identities, the system may create an aggregate entity least-privilege damage score for each identity. The entity least-privilege damage score may be calculated by aggregating the scores of the permissions associated with the particular entity (e.g., each identity). Comparing the entity least-privilege damage scores for each identity may permit the system to determine which identity is the highest risk, and thus should be addressed first. After determining the highest risk identity, the system may then compare the scores for the permissions associated with the identity to determine which permissions of the identity should be addressed first.

A second potential implementation may be to analyze and address security concerns of a company's system that includes multiple cloud computing environments. A company may have a large system that it uses to facilitate its day-to-day worldwide business operations. The system may implement various cloud computing environments from multiple cloud providers (e.g., AWS™, Azure™, Google Cloud Platform™, and others). Some environments may correspond to a division or department within the company, such as a research and development division, a legal division, a financial division, a marketing division, etc. Each environment may include a number of different cloud products (e.g., virtual machines, containers, storage, security products, and the like) and have multiple corresponding identities. The company may allocate funding and other resources to each environment based on its own automatic or manual assessment of the environments. The assessment may result in a prioritization list of environments that indicates a relative importance of the environments and according to which environments will be allocated resources.

To improve its resource allocation by gaining insight into its environments, the company may calculate security-sensitivity status scores for the environments and identify security-sensitivity status gaps, which may indicate where improvements may be made. The company may hire a third-party platform to analyze the company's environments' security-sensitivity statuses and provide a centralized interface for an administrator to manage the various environments. The third-party service may use a security server 105 to conduct the analysis. The security server 105 may identify each of the company's cloud computing environments and identify one or more attributes 601 of each environment. For each environment, security server 105 may calculate component sub-scores 602 based on the identified attributes, as described with respect to FIGS. 6-8. Then the component sub-scores may be combined to calculate a security-sensitivity status score for each environment, as described with respect to FIG. 6-8. For example, the security server 105 may calculate a security-sensitivity status score for two AWS™ environments associated with the research and development division, an Azure™ environment associated with the legal division, and a Google Cloud Platform™ environment associated with the marketing division.

Based on the security-sensitivity status scores, security server 105 may generate a priority list by ordering the environments from highest score to lowest score. Security server 105 may also access a first reference prioritization list. The reference prioritization list may be the company's current prioritization of environments (e.g., a list manually created by management). Security server 105 may also access a second reference prioritization list corresponding to one or more other organizations not associated with the company. Security server 105 may compare the second reference prioritization list to the generated priority list. Then, security server 105 may use the second reference prioritization list to edit the generated priority list to incorporate insight gained from outside organizations into the environment priorities of the company.

Security server 105 may the compare this new edited priority list to the first reference prioritization list (e.g., the list corresponding to the company's current prioritization of environments). Security server 105 may use this comparison to identify a security-sensitivity status gap that indicates the differences between the edited priority list (e.g., the security controls that should be exercised) and the first reference prioritization list (e.g., the company's currently exercised security controls). Security server 105 may use the differences indicated by the security-sensitivity status gap to provide a security response. The security response may include sending a report to the company identifying the security-sensitivity status gap. The security response may also include providing an interface, including recommendations for new security controls, to the company. An administrator of the company may then use the interface to review the analysis and select appropriate security controls to implement to remediate the security-sensitivity status gap (e.g., shift resources or change controls such that the company's actual prioritization of environments more closely reflects the newly generated priority list). For example, the administrator may choose to reallocate funds to increase security on certain environments or implement additional security actions within the environments (e.g., least privilege controls, use a privilege access security service, or the like).

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for dynamically performing security comparisons among virtualized network environments, the operations comprising:
   identifying a plurality of virtualized computing environments;
   calculating, for a first of the plurality of virtualized computing environments, a security-sensitivity status, the security-sensitivity status being based on at least:
   a size attribute of the first virtualized computing environment;
   an activity level of the first virtualized computing environment;
   a sensitivity level of the first virtualized computing environment; and
   a security level of the first virtualized computing environment;
   accessing a reference security-sensitivity status corresponding to the first virtualized computing environment;
   comparing the security-sensitivity status of the first virtualized computing environment with the reference security-sensitivity status;
   identifying, based on the comparing, a security-sensitivity status gap for the first virtualized computing environment; and
   performing, based on the identified security-sensitivity status gap, at least one of:
   generating a report identifying the security-sensitivity status gap and the first virtualized computing environment,
   transmitting data regarding the security-sensitivity status gap and the first virtualized computing environment to a network security platform, or
   generating a selectable prompt for remediating the security-sensitivity status gap for the first virtualized computing environment.

2. The non-transitory computer readable medium of claim 1, wherein the size attribute of the first virtualized computing environment is determined based on at least one of: a number of identities, groups, roles, or instances in the first virtualized computing environment.

3. The non-transitory computer readable medium of claim 1, wherein the size attribute of the first virtualized computing environment is determined based on a file size of the first virtualized computing environment.

4. The non-transitory computer readable medium of claim 1, wherein the activity level of the first virtualized computing environment is determined based on at least one of: a number of actions or a frequency of actions in the first virtualized computing environment.

5. The non-transitory computer readable medium of claim 4, wherein the activity level of the first virtualized computing environment is determined based on a determined change in the at least one of: the number of actions or the frequency of actions in the first virtualized computing environment.

6. The non-transitory computer readable medium of claim 4, wherein the activity level of the first virtualized computing environment is determined based on a geographic location associated with the at least one of: the number of actions or the frequency of actions in the first virtualized computing environment.

7. The non-transitory computer readable medium of claim 4, wherein the activity level of the first virtualized computing environment is determined based on a file size associated with the at least one of: the number of actions or the frequency of actions in the first virtualized computing environment.

8. The non-transitory computer readable medium of claim 1, wherein the activity level of the first virtualized computing environment is determined based on a number of automation tools associated with the at least one of: the number of actions or the frequency of actions in the first virtualized computing environment.

9. The non-transitory computer readable medium of claim 1, wherein the reference security-sensitivity status is at least one of: a minimal security-sensitivity status or an optimal security-sensitivity status.

10. The non-transitory computer readable medium of claim 1, wherein the reference security-sensitivity status is obtained from a network environment separate and independent from the plurality of virtualized computing environments, but determined to be similar to the first virtualized computing environment.

11. A computer-implemented method for dynamically performing security comparisons among virtualized network environments, the method comprising:
   identifying a plurality of virtualized computing environments;
   calculating, for a first of the plurality of virtualized computing environments, a security-sensitivity status, the security-sensitivity status being based on at least:
   a size attribute of the first virtualized computing environment;
   an activity level of the first virtualized computing environment;

a sensitivity level of the first virtualized computing environment; and a security level of the first virtualized computing environment;

accessing a reference security-sensitivity status corresponding to the first virtualized computing environment;

comparing the security-sensitivity status of the first virtualized computing environment with the reference security-sensitivity status;

identifying, based on the comparing, a security-sensitivity status gap for the first virtualized computing environment; and performing, based on the identified security-sensitivity status gap, at least one of:

generating a report identifying the security-sensitivity status gap and the first virtualized computing environment, transmitting data regarding the security-sensitivity status gap and the first virtualized computing environment to a network security platform, or generating a selectable prompt for remediating the security-sensitivity status gap for the first virtualized computing environment.

12. The computer-implemented method of claim 11, wherein the sensitivity level of the first virtualized computing environment is based on a number of virtualized resources in the first virtualized computing environment having privileged access restrictions.

13. The computer-implemented method of claim 11, wherein the sensitivity level of the first virtualized computing environment is based on an assessment of whether the first virtualized computing environment is cross-trusted with at least one other of the plurality of virtualized computing environments.

14. The computer-implemented method of claim 11, wherein the sensitivity level of the first virtualized computing environment is based on a number of virtualized resources in the first virtualized computing environment having encryption requirements.

15. The computer-implemented method of claim 11, wherein the sensitivity level of the first virtualized computing environment is based on an assessment of whether virtualized resources in the first virtualized computing environment contain a particular textual or numerical character string.

16. The computer-implemented method of claim 11, wherein the security level of the first virtualized computing environment is based on an assessment of whether the first virtualized computing environment complies with a security benchmark.

17. The computer-implemented method of claim 11, wherein the security level of the first virtualized computing environment is based on an assessment of whether the first virtualized computing environment implements a security technique.

18. The computer-implemented method of claim 11, wherein the security level of the first virtualized computing environment is based on a number of privileged identities in the first virtualized computing environment.

19. The computer-implemented method of claim 11, further comprising consolidating security-sensitivity statuses of each of the plurality of virtualized computing environments into a consolidated level.

20. The computer-implemented method of claim 11, further comprising automatically remediating the security-sensitivity status gap for the first virtualized computing environment based on the identified security-sensitivity status gap.

* * * * *